United States Patent [19]
Yoshizaki et al.

[11] Patent Number: 6,014,859
[45] Date of Patent: Jan. 18, 2000

[54] DEVICE FOR PURIFYING EXHAUST GAS OF ENGINE

[75] Inventors: Kouji Yoshizaki, Numazu; Takaaki Itou, Mishima, both of Japan

[73] Assignee: Toyota Jidosha Kabushiki Kaisha, Toyota, Japan

[21] Appl. No.: 09/136,766

[22] Filed: Aug. 19, 1998

[30] Foreign Application Priority Data

Aug. 25, 1997 [JP] Japan ................................ 9-228472

[51] Int. Cl.[7] ........................................................ F01N 3/00
[52] U.S. Cl. ............................ 60/285; 60/274; 60/286; 60/287; 60/303
[58] Field of Search ........................... 60/285, 286, 287, 60/295, 297, 300, 303, 284, 274; 123/443

[56] References Cited

U.S. PATENT DOCUMENTS

| | | | |
|---|---|---|---|
| 5,207,058 | 5/1993 | Sasaki et al. | 60/284 |
| 5,402,641 | 4/1995 | Katoh et al. | |
| 5,433,074 | 7/1995 | Seto et al. | 60/301 |
| 5,473,887 | 12/1995 | Takeshima et al. | |
| 5,473,890 | 12/1995 | Takeshima et al. | |
| 5,517,820 | 5/1996 | Kuroda et al. | 60/274 |
| 5,551,231 | 9/1996 | Tanaka et al. | |
| 5,740,669 | 4/1998 | Kinugasa et al. | 60/285 |
| 5,758,493 | 6/1998 | Asik et al. | 60/274 |
| 5,778,667 | 7/1998 | Kinugasa et al. | 60/274 |
| 5,839,275 | 11/1998 | Hirota et al. | 60/285 |

FOREIGN PATENT DOCUMENTS

| | | |
|---|---|---|
| A-5-156993 | 6/1993 | Japan . |
| A-6-66129 | 3/1994 | Japan . |
| A-6-88518 | 3/1994 | Japan . |
| A-6-117225 | 4/1994 | Japan . |
| A-6-173652 | 6/1994 | Japan . |
| A-6-330741 | 11/1994 | Japan . |
| A-6-336914 | 12/1994 | Japan . |
| A-7-97919 | 4/1995 | Japan . |
| A-8-61052 | 3/1996 | Japan . |
| A-8-74561 | 3/1996 | Japan . |
| A-8-100639 | 4/1996 | Japan . |
| A-8-270433 | 10/1996 | Japan . |
| A-9-32619 | 2/1997 | Japan . |
| A-9-291814 | 11/1997 | Japan . |
| 2 303 565 | 2/1997 | United Kingdom . |

OTHER PUBLICATIONS

Patent Abstracts of Japan, Publication No. 06307230, Nov. 1, 1994.
Patent Abstracts of Japan, Publication No. 08100640, Apr. 16, 1996.

*Primary Examiner*—Thomas Denion
*Assistant Examiner*—Binh Tran
*Attorney, Agent, or Firm*—Oliff & Berridge, PLC

[57] ABSTRACT

An engine has a plurality of the cylinders. The cylinders are divided into a first cylinder group and a second cylinder group, and each cylinder group is connected, via a corresponding branch exhaust passage, to a common interconnecting exhaust passage. In the interconnecting exhaust passage, an exhaust gas purifying catalyst is arranged. The air-fuel ratio of the exhaust gas of the first cylinder group is made lean to feed oxygen to the exhaust gas purifying catalyst, and the air-fuel ratio of the second cylinder group is made rich to feed fuel for heating to the exhaust gas purifying catalyst, so that the oxygen and the fuel for heating react with each other to heat the exhaust gas purifying catalyst to reactivate the exhaust gas purifying catalyst when the reactivation of the exhaust gas purifying catalyst is must be performed. In each branch exhaust passage, a start catalyst is arranged.

28 Claims, 18 Drawing Sheets

DEVICE FOR PURIFYING EXHAUST GAS OF ENGINE

BACKGROUND OF THE INVENTION

1. Field of the Invention

The present invention relates to a device for purifying the exhaust gas of an engine.

2. Description of the Related Art

If the ratio of the total amount of air fed to the intake passage, the combustion chamber, and the exhaust passage upstream of a certain position in the exhaust passage to the total amount of fuel and the reducing agent fed to the intake passage, the combustion chamber, and the exhaust passage upstream of the above-mentioned position, is referred to as an air-fuel ratio of the exhaust gas flowing through the certain position, it is well known that if an engine, in which a lean air-fuel mixture is burned, has a $NO_X$ absorbent arranged in the exhaust passage thereof, the $NO_X$ absorbent absorbs $NO_X$ therein when the air-fuel ratio of the inflowing exhaust gas is lean, and releases the absorbed $NO_X$ therefrom when the oxygen concentration in the inflowing exhaust gas becomes lower. In the engine, the air-fuel ratio of the exhaust gas flowing to the $NO_X$ absorbent is made temporarily rich to thereby release the absorbed $NO_X$ from the $NO_X$ absorbent and to reduce the released $NO_X$ by unburned hydrocarbon HC and carbon monoxide CO in the exhaust gas.

However, fuel and the lubrication oil contain sulphur containing components and, thus, the exhaust gas also contains sulphur containing components. The sulphur containing components in the form of $SO_X$, for example, are absorbed in the $NO_X$ absorbent in the form of $SO_4^{2-}$, together with $NO_X$. However, the sulphur containing components are not released from the $NO_X$ absorbent even when the air-fuel ratio of the inflowing exhaust gas is merely made rich. Thus, the amount of the sulphur containing components absorbed in the $NO_X$ absorbent increases gradually. However, if the amount of the sulphur containing components in the $NO_X$ absorbent increases, the $NO_X$ absorbing capacity of the $NO_X$ absorbent gradually becomes smaller and, at the last, the $NO_X$ absorbent can hardly absorb $NO_X$ therein.

However, the $NO_X$ absorbent releases the absorbed sulphur containing components therefrom in the form of $SO_2$, for example, when the oxygen concentration in the inflowing exhaust gas becomes lower with the temperature of the $NO_X$ absorbent being high. Thus, Japanese Unexamined Patent Publication No. 8-61052 discloses an exhaust gas purifying device for an engine with a plurality of cylinders, in which the cylinders are divided to a pair of cylinder groups. In the device, a lean air-fuel mixture is burned in one cylinder group to form the exhaust gas including the rich oxygen, a rich air-fuel mixture is burned in the other cylinder group to form the exhaust gas including the rich unburned HC and CO, and the exhaust gases are introduced to the $NO_X$ absorbent so that the unburned HC and CO are burned in the $NO_X$ absorbent to increase the temperature of the $NO_X$ absorbent. At this time, the air-fuel ratio of the entire exhaust gas is made rich and, thus the sulphur containing components are released from the $NO_X$ absorbent. Accordingly, the $NO_X$ absorbent is reactivated.

On the other hand, in general, the exhaust gas purifying catalyst arranged in the exhaust passage of the engine is not activated for a while after the engine has been started and, therefore, good exhaust gas purification of the exhaust gas purifying catalyst cannot be expected at this period. Therefore, it is well known that a catalyst for the exhaust gas purification at the start of the engine, such as a three-way catalyst, is additionally arranged in the exhaust passage upstream of the exhaust gas purifying catalyst. If such an additional catalyst is referred to as a start catalyst, the start catalyst is arranged adjacent to the engine and the heat capacity thereof is made smaller. Therefore, the start catalyst becomes active more rapid than the exhaust gas purifying catalyst after the engine is started, and reduces the amount of unburned HC and CO discharged to the outside air before the exhaust gas purifying catalyst becomes active.

However, the $NO_X$ absorbent cannot be reactivated sufficiently if the start catalyst is applied to the exhaust gas purifying device disclosed in the '052 publication. Namely, in this case, the exhaust gases of the cylinder groups are mixed and flow through the start catalyst and, then, flow into the $NO_X$ absorbent. In other words, the exhaust gas including the rich oxygen and the exhaust gas including the rich unburned HC and CO flow into the start catalyst generally simultaneously. As a result, most of the unburned HC and CO are burned or consumed in the start catalyst and, therefore, the amount of the unburned HC and CO fed to the $NO_X$ catalyst is reduced. Accordingly, the $NO_X$ absorbent is not heated sufficiently and, therefore, the sulphur containing components are not released from the $NO_X$ absorbent sufficiently.

SUMMARY OF THE INVENTION

An object of the present invention is to provide a device for purifying an exhaust gas of an engine capable of reactivating the exhaust gas purifying catalyst sufficiently, while ensuring good exhaust gas purification at the start of the engine.

According to the present invention, there is provided a device for purifying the exhaust gas of an engine having an exhaust passage, the device comprising: an exhaust gas purifying catalyst arranged in the exhaust passage; a start catalyst arranged in the exhaust passage upstream of the exhaust gas purifying catalyst; means for forming a gas including oxygen; means for forming a gas including a reducing agent; means for forming at least one of the gas including oxygen and the gas including the reducing agent from the exhaust gas of the engine; and means for mixing the gas including oxygen and the gas including the reducing agent and feeding the gas mixture to the exhaust gas purifying catalyst without the gas mixture inflowing the start catalyst.

The present invention may be more fully understood from the description of the preferred embodiments of the invention as set forth below, together with the accompanying drawings.

DESCRIPTION OF THE PREFERRED EMBODIMENTS

Figure 1:
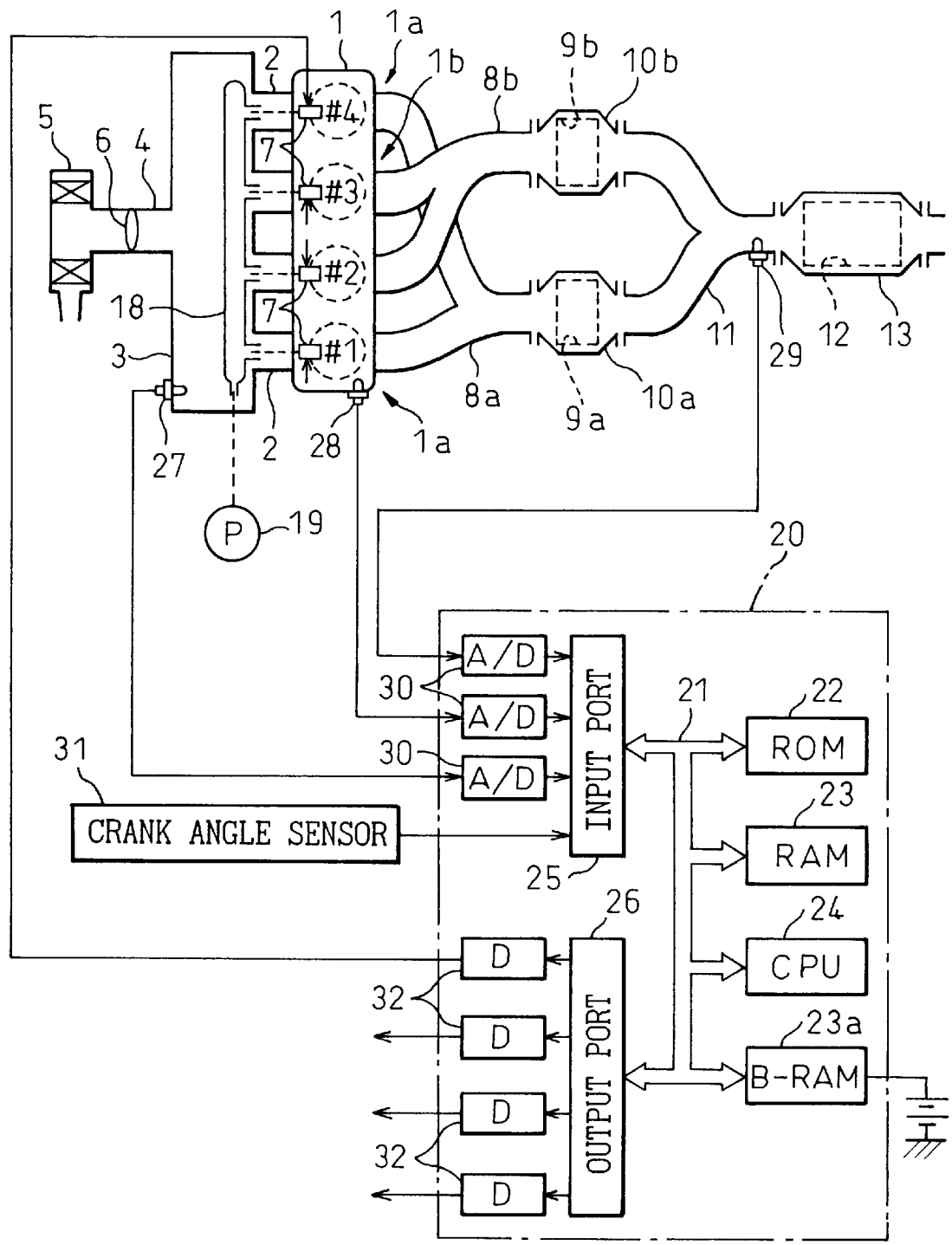
FIG. 1 is a general view of an engine.

Referring to FIG. 1, the engine body 1 comprises four cylinders #1, #2, #3, and #4, for example. Each cylinder #1–#4 is connected, via a corresponding branch 2, to a common surge tank 3. The surge tank 3 is connected, via an intake duct 4, to an air cleaner 5. A throttle valve 6 is arranged in the intake duct 4. In the combustion chamber of each cylinder, a fuel injector 7 for injecting fuel directly into the combustion chamber is arranged. The fuel injectors 7 are connected, via a common fuel accumulator 18, to a fuel pump 19. Thus, the fuel pumped out from the pump 19 is distributed from the fuel accumulator 18 to the fuel injectors 7. This allows the fuel injectors 7 to inject fuel one or more times in one combustion cycle of the cylinder. Note that the fuel injectors 7 are controlled based on the output signals from the electronic control unit 20.

In the engine shown in FIG. 1, the cylinders are divided into two cylinder groups, i.e., a first cylinder group 1a consisting of the first cylinder #1 and the fourth cylinder #4, and a second cylinder group 1b consisting of the second cylinder #2 and the third cylinder #3. The first cylinder group 1a is connected, via a first exhaust manifold 8a, to a casing 10a housing a first start catalyst 9a therein. The second cylinder group 1b is connected, via a second exhaust manifold 8b, to a casing 10b housing a second start catalyst 9b therein. The casings 10a and 10b are connected, via a common interconnecting pipe 11, to a casing 13 housing an exhaust gas purifying catalyst 12 therein. Note that the combustion sequence of the engine shown in FIG. 1 is #1-#3-#4-#2 and, therefore, the exhaust stroke of the cylinders do not overlap to each other in each cylinder group.

The electronic control unit (ECU) 20 is constructed as a digital computer and comprises a read-only memory (ROM) 22, a random-access memory (RAM) 23, a backup RAM 23a to which electric power is always supplied, the CPU (micro processor) 24, an input port 25, and an output port 26, which are interconnected with each other via a bidirectional bus 21. A pressure sensor 27 generating an output voltage in proportion to the pressure in the surge tank 3 is arranged in the surge tank 3. A water temperature sensor 28 generating an output voltage in proportion to the temperature of the engine cooling water is attached to the engine body 1. An air-fuel ratio sensor 29 generating an output voltage in proportion to the air-fuel ratio of the exhaust gas flowing in the interconnecting portion of the interconnecting pipe 11 is attached to that interconnecting portion. The output voltages of the sensors 27, 28 and 29 are input to the input port 25 via corresponding AD converters 30, respectively. The input port 25 is connected to a crank angle sensor 31, which generates a pulse whenever a crankshaft is turned by, for example, 30 degrees. The CPU 24 calculates the intake air amount according to the output voltages from the pressure sensor 27, and calculates the engine speed N according to the pulses from the crank angle sensor 31. The output port 26 is connected to the fuel injectors 7 via corresponding drive circuits 32, respectively.

The start catalysts 9a and 9b are mainly for purifying the exhaust gas, especially of hydrocarbon, until the exhaust gas purifying catalyst 12 becomes active after the engine is started. The start catalysts 9a and 9b are positioned adjacent to the combustion chambers of the engine and have heat capacities smaller than that of the exhaust gas purifying catalyst 12, so that the start catalysts 9a and 9b can rapidly become active after the engine is started. In the engine shown in FIG. 1, each start catalyst 9a, 9b is formed by a three-way catalyst. The three-way catalyst is comprised of a precious metal, such as platinum Pt, palladium Pd, rhodium Rh, and iridium Ir, carried on a carrier such as alumina. Note that the three-way catalyst may act as an oxidizing catalyst which oxidizes HC and CO in the exhaust gas.

On the other hand, in the engine shown in FIG. 1, the exhaust gas purifying catalyst 12 is formed by a $NO_X$ absorbent. The $NO_X$ absorbent is comprised of at least one substance selected from alkali metals such as potassium K, sodium Na, lithium Li, and cesium Cs, alkali earth metals such as barium Ba and calcium Ca, rare earth metals such as lanthanum La and yttrium Y, and of precious metals such as platinum Pt, palladium Pd, rhodium Rh, and iridium Ir, which are carried on a carrier such as alumina. The $NO_X$ absorbent 12 performs $NO_X$ absorbing and releasing functions in which the $NO_X$ absorbent 12 absorbs $NO_X$ therein when the air-fuel ratio of the inflowing exhaust gas is lean, and releases the absorbed $NO_X$ therefrom when the oxygen concentration in the inflowing exhaust gas becomes lower. Note that, in a case where no fuel or air is fed to the exhaust passage upstream of the $NO_X$ absorbent 12, the air-fuel ratio of the exhaust gas flowing to the $NO_X$ absorbent 12 conforms to the air-fuel ratio of the exhaust gas discharged from the engine body 1. In this case, accordingly, the $NO_X$ absorbent 12 absorbs $NO_X$ therein when the air-fuel ratio of the air-fuel ratio of the exhaust gas discharged from the engine body 1 is lean, and releases the absorbed $NO_X$ therefrom when the oxygen concentration in the exhaust gas discharged from the engine body 1 becomes lower.

When the $NO_X$ absorbent 12 is disposed in the exhaust passage of the engine, the $NO_X$ absorbent 12 actually performs the $NO_X$ absorbing and releasing function, but the function is still unclear. However, it is considered that the function is performed according to the mechanism shown in FIGS. 2A and 2B. This mechanism will be explained by using as an example the case where platinum Pt and barium Ba are carried on the carrier, but a similar mechanism is provided even if another precious metal, alkali metal, alkali earth metal, or rare earth metal is used.

Figure 2A:
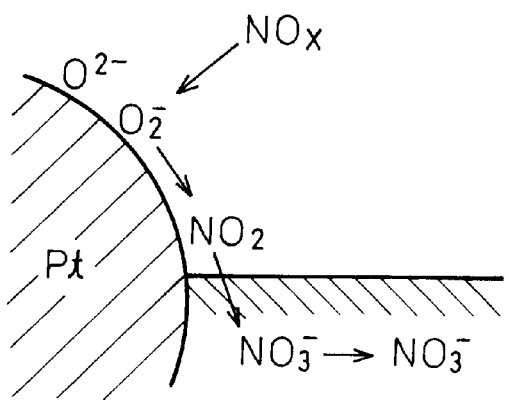
FIGS. 2A and 2B illustrate the $NO_X$ absorbing and releasing function of the $NO_X$ absorbent.

Namely, when the inflowing exhaust gas becomes considerably lean, the oxygen concentration in the inflowing exhaust gas greatly increases and, as shown in FIG. 2A, oxygen $O_2$ is deposited on the surface of the platinum Pt in the form of $O_2^-$ or $O^{2-}$. On the other hand, NO in the inflowing exhaust gas reacts with the $O_2^-$ or $O^{2-}$ on the surface of the platinum Pt and becomes $NO_2$ ($2NO + O_2 \rightarrow 2NO_2$). Subsequently, a part of the produced $NO_2$ is oxidized on the platinum Pt and is absorbed into the absorbent. While bonding with barium oxide BaO, it is diffused in the absorbent in the form of nitric acid ions $NO_3^-$, as shown in FIG. 2A. In this way, $NO_X$ is absorbed in the absorbent.

As long as the oxygen concentration in the inflowing exhaust gas is high, $NO_2$ is produced on the surface of the platinum Pt, and as long as the $NO_X$ absorbing capacity of the absorbent is not saturated, $NO_2$ is absorbed in the absorbent and the nitric acid ions $NO_3^-$ are produced. Contrarily, when the oxygen concentration in the inflowing exhaust gas becomes lower and the production of $NO_2$ is lowered, the reaction proceeds in an inverse direction ($NO_3^- \rightarrow NO_2$) and, thus, nitric acid ions $NO_3^-$ in the absorbent are released in the form of $NO_2$ from the absorbent. Namely, when the oxygen concentration in the inflowing exhaust gas becomes lower, $NO_X$ is released from the $NO_X$ absorbent 12. When the degree of leanness of the inflowing exhaust gas becomes low, the oxygen concentration in the inflowing exhaust gas is lowered and, therefore, $NO_X$ is released from the $NO_X$ absorbent 12 when the degree of leanness of the inflowing exhaust gas is lowered.

Figure 2B:
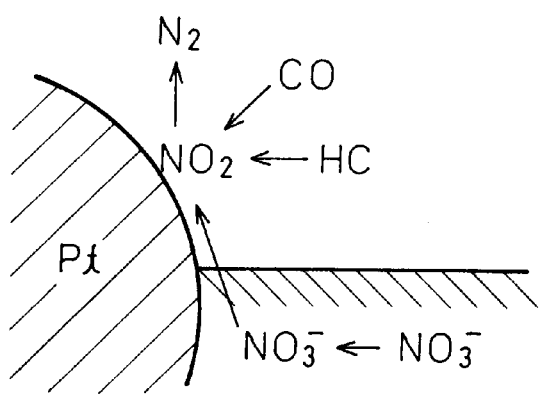

On the other hand, if the air-fuel ratio of the inflowing exhaust gas is made rich at this time, the inflowing exhaust gas includes a large amount of HC and CO. The HC and CO react with oxygen $O_2^-$ or $O^{2-}$ on the surface of platinum Pt, and are oxidized. Also, when the air-fuel ratio of the inflowing exhaust gas is made rich, the oxygen concentration in the inflowing exhaust gas is extremely lowered. Thus, $NO_2$ is released from the absorbent and the $NO_2$ reacts with the HC and CO and is reduced as shown in FIG. 2B. In this way, when no $NO_2$ exists on the surface of platinum Pt, $NO_2$ is released from the absorbent successively. Therefore, when the air-fuel ratio of the inflowing exhaust gas is made rich, $NO_X$ is released from the $NO_X$ absorbent 12 in a short time.

In this way, $NO_X$ is absorbed in the $NO_X$ absorbent 12 when the air-fuel ratio of the inflowing exhaust gas is made lean, and $NO_X$ is released from the $NO_X$ absorbent 12 in a short time when the air-fuel ratio of the inflowing exhaust gas is made rich. Therefore, in the engine shown in FIG. 1, the air-fuel ratio of the exhaust gas flowing the $NO_X$ absorbent 12 is usually made lean, and is made temporarily rich to thereby release $NO_X$ from the $NO_X$ absorbent 12 and to reduce the $NO_X$, when an amount of $NO_X$ absorbed in the $NO_X$ absorbent 12 becomes larger than a constant amount.

If the fuel injection performed from the intake stroke of the engine until the beginning of the combustion stroke of the engine to obtain the engine output is referred to as a main fuel injection, the air-fuel ratio of the exhaust gas flowing to the $NO_X$ absorbent 12 is made rich temporarily when the air-fuel ratio of the air-fuel mixture fed to the cylinder by the main fuel injection is made rich temporarily. Alternatively, if the additional fuel injection performed at the end of the combustion stroke or the exhaust stroke is referred to as a secondary fuel injection, the air-fuel ratio of the exhaust gas discharged from the engine is also made rich temporarily by the secondary fuel injection. In this case, the fuel fed by the secondary fuel injection is partially oxidized in the combustion chamber or the exhaust passage upstream of the $NO_X$ absorbent 12 without being perfectly oxidized and, thus, $NO_X$ is easily reduced in the $NO_X$ absorbent 12. Therefore, in the engine shown in FIG. 1, when the absorbed $NO_X$ amount in the $NO_X$ absorbent 12 becomes larger than the constant amount, the secondary fuel injection is performed in all cylinders for a constant time to make the air-fuel ratio of the exhaust gas flowing to the $NO_X$ absorbent 12 rich temporarily, to thereby release $NO_X$ from the $NO_X$ absorbent 12 and reduce the $NO_X$. Note that fuel fed by the secondary fuel injection provides almost no contribution to the engine output.

In other words, in the engine shown in FIG. 1, usually, the fuel injection is performed once in one combustion cycle in all cylinders, i.e., only the main fuel injection is performed. At this time, the air-fuel ratio of the air-fuel mixture fed to the cylinder by the main fuel injection is made lean, such as 16.0, and the air-fuel ratio of the exhaust gas flowing to the $NO_X$ absorbent 12 is made lean. Contrarily, when $NO_X$ must be released from the $NO_X$ absorbent 12, the fuel injection is made twice in one combustion cycle in all cylinders, i.e., the main fuel injection and the secondary fuel injection are performed. At this time, the air-fuel ratio of the air-fuel mixture fed to the cylinder by the main fuel injection is made lean, such as 16.0, but the air-fuel ratio of the exhaust gas discharged from the combustion chamber is made rich, such as 12.0, by the secondary fuel injection. Therefore, the air-fuel ratio of the exhaust gas flowing to the $NO_X$ absorbent 12 is made rich. Note that the timing of the secondary fuel injection may be set at from 90° to 150° crank angle after the top dead center of the compression stroke.

However, the exhaust gas contains sulphur containing components and, thus, the $NO_X$ absorbent 12 absorbs not only $NO_X$, but also sulphur containing components such as $SO_X$. It is considered that the absorption mechanism of the sulphur containing components into the $NO_X$ absorbent 12 is same as that of $NO_X$.

Namely, when explaining the mechanism by taking an example in which platinum Pt and barium Ba are carried on the carrier, as in the explanation of the $NO_X$ absorption mechanism, oxygen $O_2$ is deposited on the surface of platinum Pt, in the form of $O_2^-$ or $O^{2-}$, when the air-fuel ratio of the inflowing exhaust gas is lean, as mentioned above. $SO_X$ such as $SO_2$ in the inflowing exhaust gas reacts with $O_2^-$ or $O^{2-}$ on the surface of platinum Pt and becomes $SO_3$. The produced $SO_3$ is then further oxidized on the platinum Pt and is absorbed into the absorbent. While bonding with barium oxide BaO, it is diffused in the absorbent in the form of sulfuric acid ions $SO_4^{2-}$. The sulfuric acid ions $SO_4^{2-}$ bond with barium ions $Ba^{2+}$ to produce the sulphate $BaSO_4$.

However, the sulphate $BaSO_4$ is difficult to decompose and, even if the air-fuel ratio of the inflowing exhaust gas is merely made rich, the sulphate $BaSO_4$ remains as it is without being decomposed. Accordingly, as the time is elapsed, the amount of the sulphate $BaSO_4$ in the $NO_X$ absorbent 12 increases and, thus, the amount of $NO_X$ that can be absorbed in the $NO_X$ absorbent 12 will be lowered. In other words, the $NO_X$ absorbent 12 is poisoned by the sulphur containing components.

However, when the temperature of the $NO_X$ absorbent 12 is high, the sulphate $BaSO_4$ produced in the $NO_X$ absorbent 12 can be easily decomposed by making the air-fuel ratio of the inflowing exhaust gas rich or stoichiometric and, thus, the sulfuric acid ions $SO_4^{2-}$ are released from the absorbent in the form of $SO_3$. Namely, the $NO_X$ absorbent 12 can be reactivated. Therefore, in the engine shown in FIG. 1, first, it is judged whether the $NO_X$ absorbent 12 is poisoned by the sulphur containing components and, if the $NO_X$ absorbent 12 is judged to be poisoned, the temperature of the $NO_X$ absorbent 12 is increased to be higher than a predetermined temperature, i.e., a temperature required to release the sulphur containing components from the $NO_X$ absorbent 12, and the air-fuel ratio of the exhaust gas flowing to the $NO_X$ absorbent 12 is made rich temporarily, to thereby release sulphur containing components from the $NO_X$ absorbent 12. In this way, the $NO_X$ absorbent 12 is reactivated. The released $SO_3$ is reduced to $SO_2$ immediately by HC and CO in the inflowing exhaust gas.

The oxidizing reaction of HC and CO in the $NO_X$ absorbent 12 increases the temperature of the $NO_X$ absorbent 12, and the temperature of the $NO_X$ absorbent 12 becomes higher as the amount of HC and CO oxidized in the $NO_X$ absorbent 12 becomes larger. On the other hand, the exhaust gas including the rich HC is formed when the air-fuel ratio of the exhaust gas discharged from the combustion chamber is made rich, and the exhaust gas including the rich oxygen $O_2$ is formed when the air-fuel ratio of the exhaust gas discharged from the combustion chamber is made lean. If the exhaust gas including the rich HC and the exhaust gas including the rich oxygen $O_2$ are introduced to the $NO_X$ absorbent 12 simultaneously, a large amount of HC is oxidized in the $NO_X$ absorbent 12 and, therefore, the HC acts as fuel for heating the $NO_X$ absorbent 12 and the temperature of the $NO_X$ absorbent 12 can be much increased. At this time, the air-fuel ratio of the exhaust gas flowing to the $NO_X$ absorbent 12 can be made rich. Therefore, in the engine shown in FIG. 1, when the release of the sulphur containing components from the $NO_X$ absorbent 12 must be performed, the air-fuel ratio of the exhaust gas discharged from the first cylinder group 1a is made lean temporarily and the air-fuel ratio of the exhaust gas discharged from the second cylinder group 1b is made rich temporarily and, at this time, the air-fuel ratio of the entire exhaust gas flowing to the $NO_X$ absorbent 12 is made rich.

In this case, the fuel injection is performed once in one combustion cycle in the first cylinder group, i.e., only the main fuel injection is performed. At this time, the air-fuel ratio of the air-fuel mixture fed to the cylinder by the main fuel injection is made lean, such as 16.0, and the air-fuel ratio of the exhaust gas discharged from the first cylinder group 1a is made lean. Contrarily, the fuel injection is made twice in one combustion cycle in the second cylinder group, i.e., the main fuel injection and the secondary fuel injection are performed. At this time, the air-fuel ratio of the air-fuel mixture fed to the cylinder by the main fuel injection is made lean, such as 16.0, but the air-fuel ratio of the exhaust gas discharged from the second cylinder group 1b is made rich, such as 12.0, by the secondary fuel injection. Therefore, the air-fuel ratio of the exhaust gas discharged from the second cylinder group 1b is made rich. Accordingly, the air-fuel ratio of the entire exhaust gas flowing to the $NO_X$ absorbent 12 is made rich, such as 14.0. Note that the air-fuel ratio of the air-fuel mixture fed to each cylinder or the air-fuel ratio of the exhaust gas discharged from each cylinder are made identical, in each cylinder group, in the engine shown in FIG. 1.

It is difficult to judge directly whether the $NO_X$ absorbent 12 is poisoned by the sulphur containing components. However, the $NO_X$ absorbent 12 can be judged to be poisoned when the amount of sulphur containing components absorbed in the $NO_X$ absorbent 12 becomes larger than a constant amount, and the amount of sulphur containing components absorbed in the $NO_X$ absorbent 12 is proportional to the cumulative fuel injection time STAU when the air-fuel ratio of the exhaust gas flowing to the $NO_X$ absorbent 12 is lean. Therefore, in the engine shown in FIG. 1, the cumulative fuel injection time STAU when the air-fuel ratio of the exhaust gas flowing to the $NO_X$ absorbent 12 is lean, i.e., at the usual injection, is found and, the $NO_X$ absorbent 12 is judged to be poisoned by the sulphur containing components when the cumulative fuel injection time STAU becomes longer than a predetermined time STAU1.

However, when the temperature of the $NO_X$ absorbent 12 is low, as in a case where the idling of the engine has been in process for a long time, a part of HC may be discharged from the $NO_X$ absorbent 12 without being sufficiently oxidized if the large amount of HC is fed to the $NO_X$ absorbent 12. Or, a very large amount of HC or a very long time is required to increase the temperature of the $NO_X$ absorbent 12 to a temperature required to release the sulphur containing components from the $NO_X$ absorbent 12 sufficiently, such as 600° C. Therefore, in the engine shown in FIG. 1, when the $NO_X$ absorbent 12 is judged to be poisoned by the sulphur containing components and the temperature of the $NO_X$ absorbent 12 is higher than a predetermined temperature, such as 400–500° C., the condition for the release of the sulphur containing components is judged to be satisfied and, accordingly, the release of the sulphur containing components is performed.

While a temperature sensor arranged in the exhaust passage is able to judge whether the temperature of the $NO_X$ absorbent 12 is higher than the predetermined temperature, the judgement can be made based on the engine operating condition. Namely, the temperature of the $NO_X$ absorbent 12 becomes higher as the engine load becomes higher. Also, the temperature of the $NO_X$ absorbent 12 becomes higher as the elapsed time becomes longer after the engine load is increased. Thus, in the engine shown in FIG. 1, the condition for the release of the sulphur containing components is judged to be satisfied when the engine load is kept higher than a constant value for a constant time.

When the temperature of the $NO_X$ absorbent 12 is relatively high, the amount of the sulphur containing components released from the $NO_X$ absorbent 12 per unit time is proportional to the amount of the reducing agent such as HC and CO flowing to the $NO_X$ absorbent 12 per unit time, and the amount of the reducing agent flowing to the $NO_X$ absorbent 12 per unit time is proportional to the amount of the exhaust gas flowing to the $NO_X$ absorbent 12 per unit time. Thus, the cumulative amount SEG of the exhaust gas flowing to the $NO_X$ absorbent 12 of which air-fuel ratio is rich when the reactivation of the $NO_X$ absorbent 12 is in process becomes relatively large, the release of the sulphur containing components can be judged to be finished. Therefore, in the engine shown in FIG. 1, the cumulative amount SEG of the exhaust gas is found, and the release of the sulphur containing components is continued until the cumulative amount SEG becomes larger than a predetermined amount SEG1. Namely, the reactivation of the $NO_X$ absorbent 12 is judged to be finished when SEG>SEG1.

However, when the release of the sulphur containing components is in process, if the engine operation is turned to the idling and thereby the temperature of the $NO_X$ absorbent 12 becomes lower, the condition for the release of the sulphur containing components becomes unsatisfied. In this case, the release of the sulphur containing components is stopped temporarily. When the release of the sulphur containing components is stopped temporarily in this way, the cumulative amount SEG of the exhaust gas is maintained as it is. When the condition for the release of the sulphur containing components becomes satisfied again, the cumulation of the cumulative amount SEG is resumed from the maintained cumulative amount SEG. The release of the sulphur containing components is performed repeatedly until the cumulative amount SEG becomes larger than the predetermined amount SEG1. Note that, when the release of the sulphur containing components is finished, the cumulative fuel injection time STAU is cleared (STAU=0).

In this way, the release of the sulphur containing components is finished when the cumulative amount SEG of the exhaust gas becomes larger than SEG1, or is temporarily stopped when the condition for the release of the sulphur containing components is unsatisfied. In other words, the air-fuel ratio of the entire exhaust gas flowing to the $NO_X$ absorbent 12 is prevented from being rich. However, after the finish or the temporary stop of the release of the sulphur containing components, if the air-fuel ratio of the entire exhaust gas flowing to the $NO_X$ absorbent 12 is returned to lean immediately, the sintering of the catalytic components of the $NO_X$ absorbent 12 such as platinum Pt may easily occur, because the temperature of the $NO_X$ absorbent 12 is still relatively high at this time. On the other hand, if the air-fuel ratio of the entire exhaust gas flowing to the $NO_X$ absorbent 12 is changed to stoichiometric, the temperature of the $NO_X$ absorbent 12 can be lowered to a temperature in which the sintering of platinum will not occur, while avoiding the sintering of platinum Pt. Therefore, in the engine shown in FIG. 1, when the release of the sulphur containing components is finished or temporarily stopped, the air-fuel ratio of the entire exhaust gas flowing to the $NO_X$ absorbent 12 is changed to stoichiometric temporarily and, then, is returned to lean. In this case, the air-fuel ratio of the air-fuel mixture fed to the cylinder by the main fuel injection is made stoichiometric in all cylinders, and the secondary fuel injection is not performed.

A time required to reduce the temperature of the $NO_X$ absorbent 12 to a temperature in which the sintering of platinum Pt will not occur is proportional to the amount of the exhaust gas flowing through the $NO_X$ absorbent 12 during the release of the sulphur containing components performed just before. On the other hand, the cooling rate of the $NO_X$ absorbent 12 is proportional to the amount of the exhaust gas flowing through the $NO_X$ absorbent 12 of which the air-fuel ratio is stoichiometric per unit time. Therefore, in the engine shown in FIG. 1, the cumulative amount SFB of the exhaust gas flowing to the $NO_X$ absorbent 12 of which the air-fuel ratio is stoichiometric is found, a set value SFB1, which becomes larger as the amount of the exhaust gas flowing through the $NO_X$ absorbent 12 during the release of the sulphur containing components performed just before becomes larger, is found, and the air-fuel ratio of the exhaust gas flowing to the $NO_X$ absorbent 12 is kept stoichiometric until the cumulative amount SFB becomes larger than the set value SFB1. Note that, if the release of the sulphur containing components is performed for 20 seconds under a constant engine operating condition, the air-fuel ratio of the exhaust gas flowing to the $NO_X$ absorbent 12 is then made stoichiometric for 60 seconds, for example.

Next, the method for calculating the fuel injection time in the engine shown in FIG. 1 will be explained.

As mentioned above, the main fuel injection and the secondary fuel injection may be performed in the engine shown in FIG. 1. The fuel injection time TAUM for the main fuel injection is calculated based on the following equation, for example:

$$TAUM=TP \cdot FAF \cdot KI \cdot KM$$

where TP, FAF, KI, and KM represent a basic fuel injection time, a feedback correction coefficient, an increasing correction coefficient, and a main air-fuel ratio correction coefficient, respectively.

Figure 3:
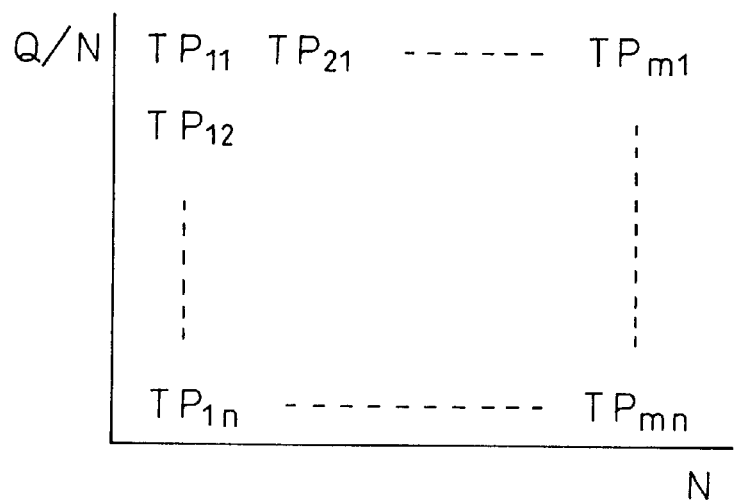
FIG. 3 is a diagram illustrating the basic fuel injection time.

The basic fuel injection time TP is a fuel injection time required to make the air-fuel ratio of the air-fuel mixture to be fed to the cylinder stoichiometric. The basic fuel injection time TP is obtained in advance by experiment and is stored in the ROM 22 in advance as a function of the engine load Q/N (the intake air amount Q/the engine speed N), in the form of a map as shown in FIG. 3.

The feedback correction coefficient FAF is for maintaining the air-fuel ratio of the air-fuel mixture to be fed to the cylinder stoichiometric. The feedback correction coefficient FAF is set in accordance with the output of the air-fuel ratio sensor 29 when the air-fuel ratio of the air-fuel mixture to be fed to the cylinder must be made stoichiometric, and is fixed to 1.0, otherwise.

The increasing correction coefficient KI represents an increasing correction coefficient for the engine starting operation, an increasing correction coefficient for the warming up, an increasing correction coefficient for the acceleration, etc., together. The increasing correction coefficient KI is set to 1.0 when no increasing correction is needed.

The main air-fuel ratio correction coefficient KM is for controlling the air-fuel ratio of the air-fuel mixture to be fed to the cylinder by the main fuel injection. If KM=1.0, the air-fuel ratio of the air-fuel mixture to be fed to the cylinder by the main fuel injection is made stoichiometric. If KM<1.0, the air-fuel ratio of the air-fuel mixture to be fed to the cylinder by the main fuel injection is made larger than the stoichiometric air-fuel ratio, i.e., is made lean. If K>1.0, the air-fuel ratio of the air-fuel mixture to be fed to the cylinder by the main fuel injection is made smaller than the stoichiometric air-fuel ratio, i.e., is made rich.

On the other hand, the fuel injection time TAUS for the secondary fuel injection is calculated based on the following equation, for example:

$$TAUS=TP \cdot FAF \cdot KI \cdot KS$$

where KS represents a secondary air-fuel ratio correction coefficient. The secondary air-fuel ratio correction coefficient KS is for controlling the air-fuel ratio of the air-fuel mixture to be fed to the cylinder by the secondary fuel injection to control the air-fuel ratio of the exhaust gas discharged from the combustion chamber, i.e., the air-fuel ratio of the exhaust gas flowing to the $NO_X$ absorbent 12. Namely, the total amount of fuel fed to the cylinder by the fuel injector 7 is proportional to (KM+KS) and, therefore, if (KM+KS) is referred to as an exhaust gas air-fuel ratio correction coefficient KE, the air-fuel ratio of the exhaust gas discharged from the combustion chamber is stoichiometric when KE=1.0. If KE<1.0, the air-fuel ratio of the exhaust gas discharged from the combustion chamber is made larger than the stoichiometric air-fuel ratio, i.e., is made lean. If KE>1.0, the air-fuel ratio of the exhaust gas discharged from the combustion chamber is made smaller than the stoichiometric air-fuel ratio, i.e., is made rich. In the engine shown in FIG. 1, first, the exhaust gas air-fuel ratio correction coefficient KE and the main air-fuel ratio correction coefficient KM are found and, then, the secondary air-fuel ratio correction coefficient KS is found as the subtraction result (KE−KM). In this case, when the secondary air-fuel ratio correction coefficient KS is set to zero, the secondary fuel injection is not performed. Note that the main air-fuel ratio correction coefficient KM and the exhaust gas air-fuel ratio correction coefficient KE are respectively represented by KAM and KAE when the fuel injection time to be found is for the first cylinder group 1a, and are respectively represented by KBM and KBE when the fuel injection time to be found is for the second cylinder group 1b.

As mentioned above, the start catalyst is for purifying the exhaust gas as much as possible until the $NO_X$ absorbent 12 becomes active. Therefore, this can be achieved even when a single start catalyst is arranged in the interconnecting portion of the interconnecting pipe 11. However, in this case, if the air-fuel ratio of the exhaust gas of the first cylinder group 1a is made lean and the air-fuel ratio of the exhaust gas of the second cylinder group 1b is made rich, the exhaust gas mixture flows to the start catalyst while HC and oxygen $O_2$ in the exhaust gases are mixed. As a result, the majority of HC in the exhaust gas is oxidized or consumed in the start catalyst. Namely, the amount of HC and oxygen $O_2$ flowing to the $NO_X$ absorbent 12 becomes smaller and, therefore, it is not possible to increase the temperature of the $NO_X$ absorbent 12 sufficiently.

Contrarily, in the embodiment according to the present invention, the exhaust gas of the first cylinder group 1a flows through the start catalyst 9a without mixing with the exhaust gas of the second cylinder group 1b, and the exhaust gas of the second cylinder group 1b flows through the start catalyst 9b without mixing with the exhaust gas of the first cylinder group 1a. Thus, the amount of oxygen $O_2$ consumed in the start catalyst 9a and the amount of HC consumed in the start catalyst 9b are extremely suppressed when the air-fuel ratio of the exhaust gas of the first cylinder group 1a is made lean and that of the second cylinder group 1b is made rich. This ensures the supply of the large amount of HC and oxygen $O_2$ to the $NO_X$ absorbent 12 and, therefore, the sufficient increase of the temperature of the $NO_X$ absorbent 12.

Figure 4:
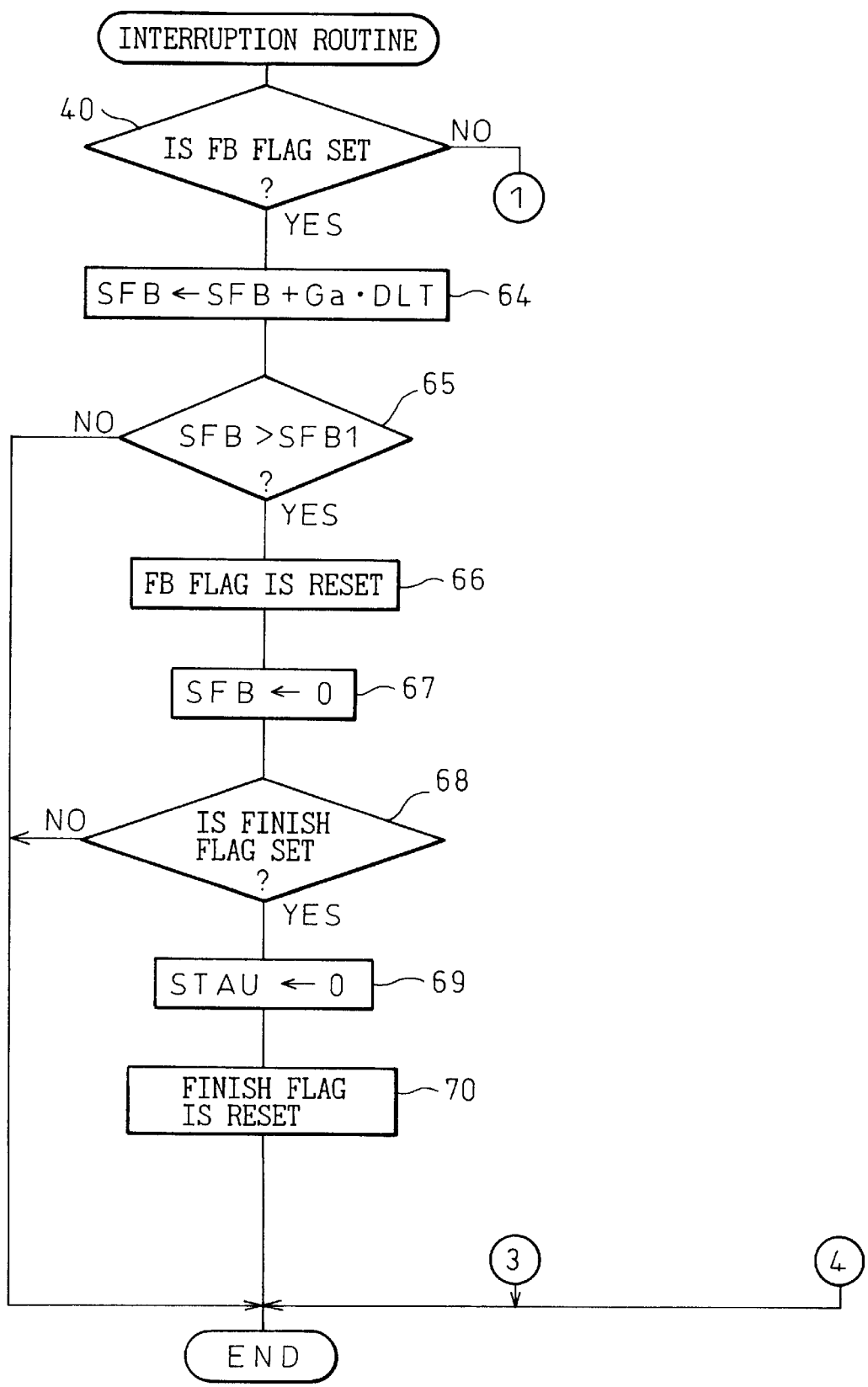
FIGS. 4 to 6 show a flowchart illustrating the interruption routine.
Figure 5:
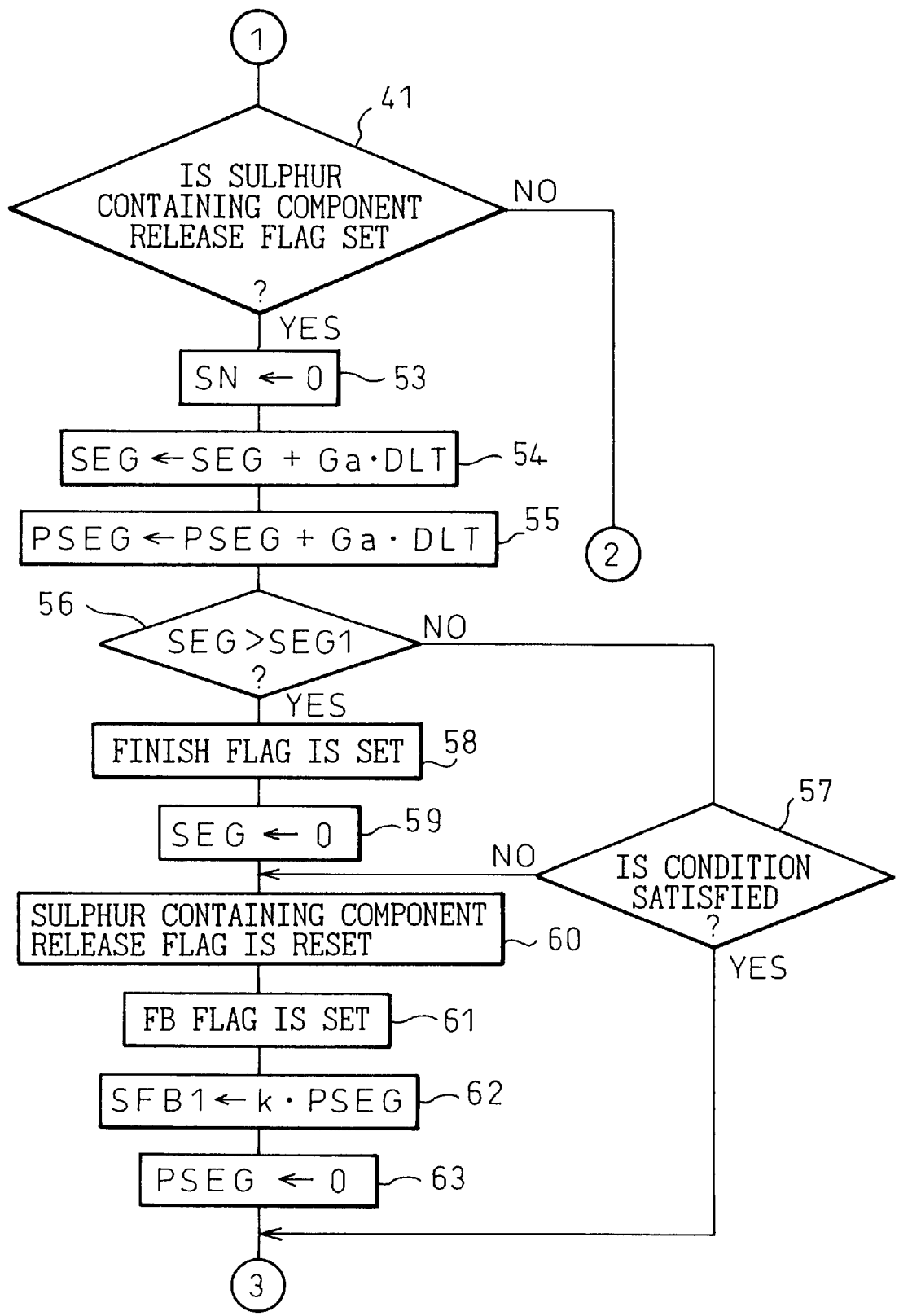
Figure 6:
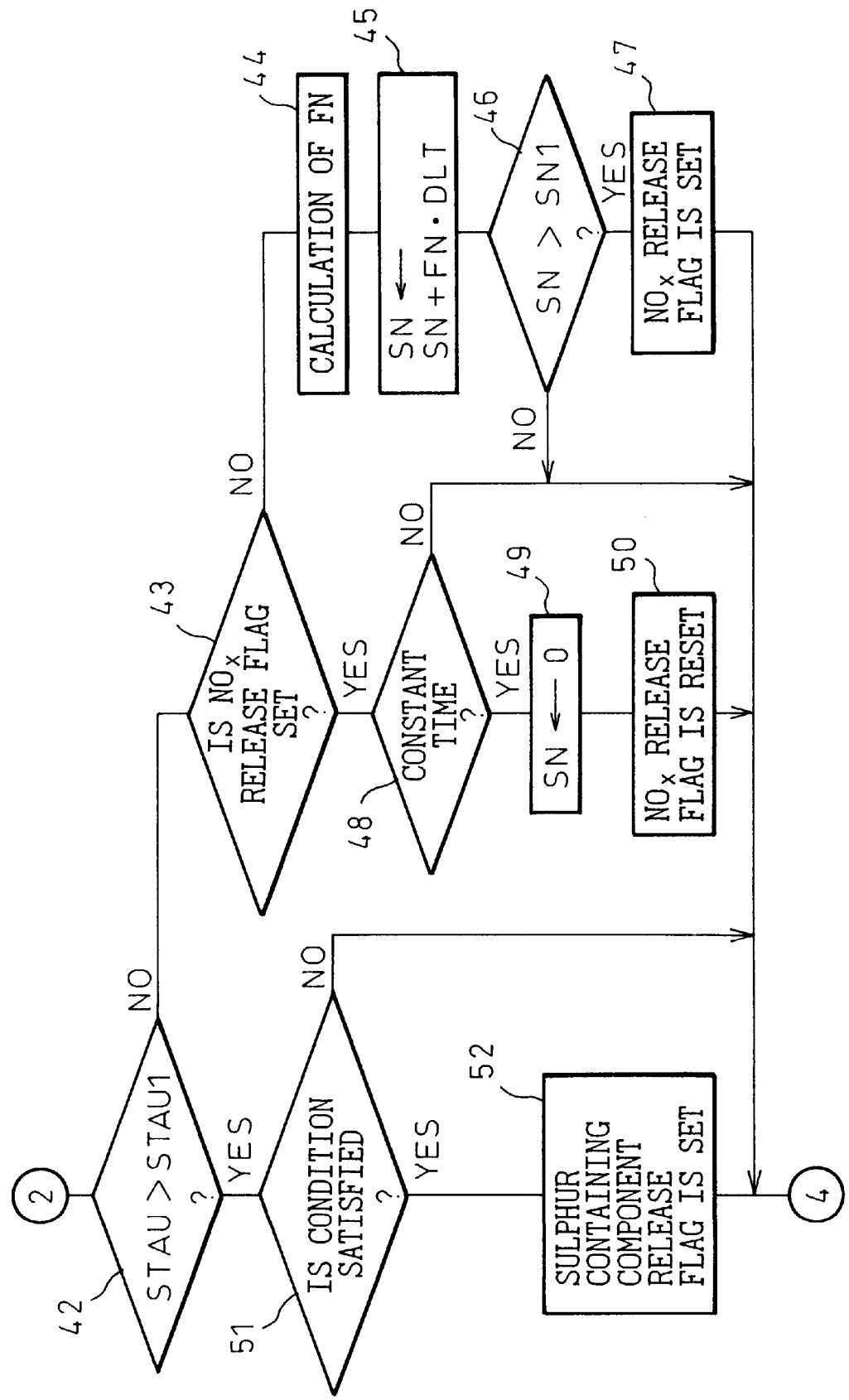

FIGS. 4 to 6 show an interruption routine executed by interruption every predetermined time.

Referring to FIGS. 4 to 6, first, in step 40, it is judged whether a FB flag is set. The FB flag is set when the air-fuel ratio of the exhaust gas flowing to the $NO_X$ absorbent 12 must be stoichiometric, and is reset otherwise. The FB flag is usually reset and, thus, the routine goes to step 41, where it is judged whether a sulphur containing components release flag is set. The sulphur containing components release flag is set when the release of the sulphur containing components must be performed, and is reset otherwise. The sulphur containing components release flag is usually reset and, thus, the routine goes to step 42, where it is judged whether the cumulative fuel injection time STAU is longer than the predetermined time STAU1. When STAU≦STAU1, the routine goes to step 43, where it is judged whether a $NO_X$ release flag is set. The $NO_X$ release flag is set when the release of $NO_X$ must be performed, and is reset otherwise. The $NO_X$ release flag is usually reset and, thus, the routine goes to steps 44 and 45, where the amount SN of $NO_X$ absorbed in the $NO_X$ absorbent 12 is found. At this time, the air-fuel ratio of the exhaust gas flowing to the $NO_X$ absorbent 12 is lean and, therefore, the $NO_X$ absorption is in process. The amount of $NO_X$ absorbed in the $NO_X$ absorbent 12 per unit time approximately equals to the amount FN of $NO_X$ flowing to the $NO_X$ absorbent 12 per unit time, and the inflowing $NO_X$ amount FN depends on the engine operating condition.

Figure 7A:
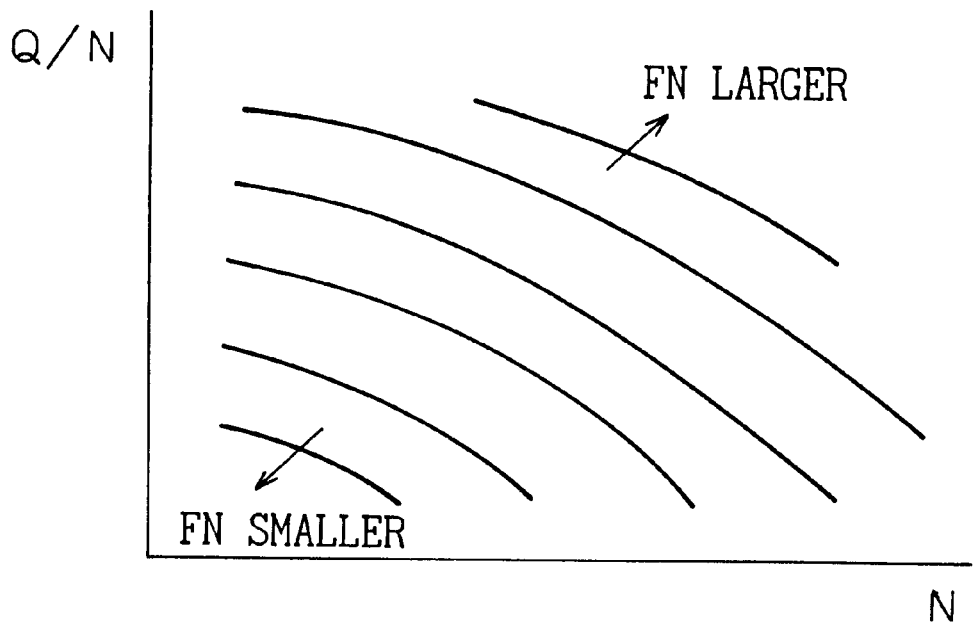
FIGS. 7A and 7B are diagrams illustrating the amount of $NO_X$ flowing to the $NO_X$ absorbent per unit time.
Figure 7B:
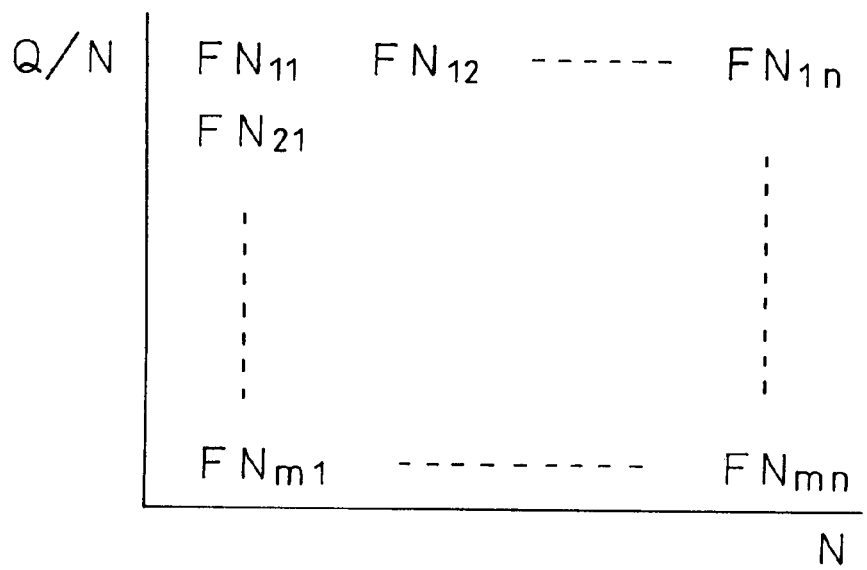

As shown in FIG. 7A in which each curve shows the identical inflowing $NO_X$ amount FN, the inflowing $NO_X$ amount FN becomes larger as the engine load Q/N becomes higher, and becomes larger as the engine speed N becomes higher. Thus, in the engine shown in FIG. 1, the inflowing $NO_X$ amount FN is obtained, by experiment in advance, as a function of the engine load Q/N and the engine speed N. The inflowing $NO_X$ amount FN is stored in the ROM 22 in advance in the form of the map shown in FIG. 7B. In step 44, the inflowing $NO_X$ amount FN is calculated based on the engine load Q/N and the engine speed N using the map shown in FIG. 7B. In the following step 45, the absorbed $NO_X$ amount SN is calculated based on the following equation.

$$SN=SN+FN \cdot DLT$$

where DLT represents a period from the last processing cycle to the present processing cycle and, thus, the FN·DLT represents the amount of $NO_X$ absorbed in the $NO_X$ absorbent 12 from the last processing cycle to the present processing cycle. In the following step 46, it is judged whether the absorbed $NO_X$ amount SN is larger than the predetermined amount SN1. The predetermined amount SN1 corresponds to about 30% of the maximum $NO_X$ amount which the $NO_X$ absorbent 12 can absorb therein, for example. When SN≦SN1, the processing cycle is ended. Contrarily, when SN>SN1, the routine goes to step 47, where the $NO_X$ release flag is set.

When the $NO_X$ release flag is set, the routine goes from step 43 to step 48. At this time, the air-fuel ratio of the exhaust gas flowing to the $NO_X$ absorbent 12 is made rich and, thus, the release of $NO_X$ is in process in the $NO_X$ absorbent 12. In step 48, it is judged whether a constant time, such as one second, has passed from when the $NO_X$ release flag is set, i.e., the air-fuel ratio of the exhaust gas flowing to the $NO_X$ absorbent 12 is changed to rich. When the constant time has not passed, the processing cycle is ended. Contrarily, when the constant time has passed, the routine goes to step 49, where the absorbed $NO_X$ amount SN is cleared (SN=0). In the following step 50, the $NO_X$ release flag is reset and, then, the processing cycle is ended. At this time, the air-fuel ratio of the exhaust gas flowing to the $NO_X$ absorbent 12 is returned to lean.

When the cumulative fuel injection time STAU becomes longer than the predetermined time STAU1, the routine goes from step 42 to step 51, where it is judged whether the condition for the release of the sulphur containing components is satisfied. As mentioned above, in the engine shown in FIG. 1, the condition is judged to be satisfied when the engine load Q/N is kept higher than the constant value for the constant time. When the condition is satisfied, the routine goes to step 52, where the sulphur containing components release flag is set.

When the sulphur containing components release flag is set, the routine goes from step 41 to step 53. At this time, the air-fuel ratio of the exhaust gas flowing to the $NO_X$ absorbent 12 is made rich and, therefore, the release of $NO_X$ is in process, together with the release of the sulphur containing components. Thus, in step 53, the absorbed $NO_X$ amount SN is cleared (SN=0). In the following step 54, the cumulative amount SEG of the exhaust gas flowing through the $NO_X$ absorbent 12 from when the release of the sulphur containing components is started to when the release of the sulphur containing components is completed is calculated based on the following equation.

$$SEG=SEG+Ga \cdot DLT$$

where Ga represents the mass flow rate of the intake air and, therefore, Ga·DLT represents the amount of the exhaust gas flowing through the $NO_X$ absorbent 12 from the last processing cycle to the present processing cycle. In the following step 55, the cumulative amount PSEG of the exhaust gas flowing through the $NO_X$ absorbent 12 from when the release of the sulphur containing components is started or resumed to when the release of the sulphur containing components is completed or temporarily stopped is calculated based on the following equation.

$$PSEG=PSEG+Ga \cdot DLT$$

In the following step 56, it is judged whether the cumulative amount SEG of the exhaust gas is larger than the predetermined amount SEG1. When SEG≦SEG1, i.e., when the release of the sulphur containing components is not sufficient, the routine goes to step 57, where it is judged whether the condition for the release of the sulphur containing components is still satisfied. When the condition is still satisfied, the processing cycle is ended and, therefore, the release of the sulphur containing components is continued. Contrarily, when the condition is unsatisfied, the routine jumps to step 60. Contrarily, when SEG>SEG1 in step 56, i.e., when the release of the sulphur containing components is finished, the routine goes to step 58, where a finish flag is set. The finish flag is set when the release of the sulphur containing components must be finished, and is reset otherwise. In the following step 59, the cumulative amount SEG of the exhaust gas is cleared (SEG=0). Then, the routine goes to step 60.

In step 60, the sulphur containing components release flag is reset. As explained hereinafter, the release of the sulphur containing components is stopped when the sulphur containing components release flag is reset. Therefore, it can be detected that the release of the sulphur containing components is finished when the routine goes from step 59 to step 60, and is temporarily stopped when the routine goes from step 57 to step 60. In the following step 61, the FB flag is set. When the FB flag is set, the air-fuel ratio of the exhaust gas flowing to the $NO_X$ absorbent 12 is made stoichiometric. In the following step 62, the product PSEG·k of the amount PSEG of the exhaust gas and a constant value k is memorized as the set value SFB1. In the following step 63, the amount of the exhaust gas PSEG is cleared (PSEG=0) and, then, the processing cycle is ended.

When the FB flag is set, the routine goes from step 40 to step 64, where the cumulative amount SFB of the exhaust gas flowing to the $NO_X$ absorbent 12 of which the air-fuel ratio is made stoichiometric is calculated based on the following equation.

$$SFB=SFB+Ga \cdot DLT$$

In the following step 65, it is judged whether the cumulative amount SFB of the exhaust gas is larger than the set valve SFB1. When SFB≦SFB1, the $NO_X$ absorbent 12 is judged not to be cooled sufficiently and, thus, the processing cycle is ended. Namely, the air-fuel ratio of the exhaust gas flowing to the $NO_X$ absorbent 12 is kept stoichiometric. Contrarily, when SFB>SFB1, the routine goes to step 66, the FB flag is reset. Accordingly, the air-fuel ratio of the exhaust gas flowing to the $NO_X$ absorbent 12 is returned to lean. In the following step 67, the cumulative amount SFB of the exhaust gas is cleared (SFB=0). In the following step 68, it is judged whether the finish flag is set. When the finish flag is set, i.e., when the routine goes to step 68 due to the finish of the release of the sulphur containing components, the routine goes to step 69, where the cumulative fuel injection time STAU is cleared (STAU=0) and, in the following step 70, the finish flag is reset. Then, the processing cycle is ended. Contrarily, when the finish flag is reset in step 68, i.e., when the routine goes to step 68 due to the temporary stoppage of the release of the sulphur containing components, the processing cycle is ended without clearing the cumulative fuel injection time STAU. Thus, in the successive processing cycle, the routine goes from step 42 to step 51 and, therefore, the release of the sulphur containing components is resumed when the condition for the release of the sulphur containing components is satisfied again.

Figure 8:
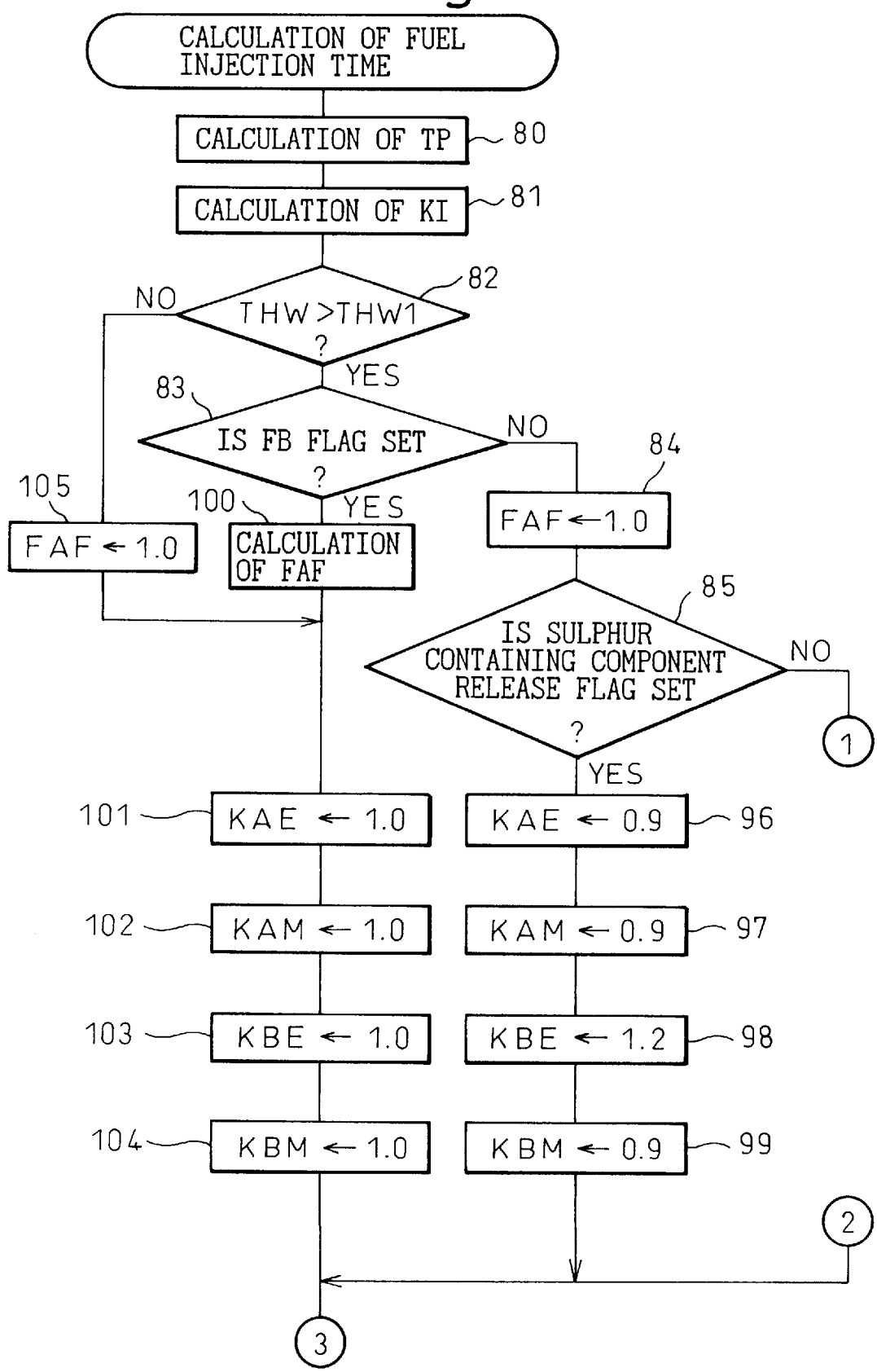
FIGS. 8 to 10 show a flowchart for calculating the fuel injection time.
Figure 9:
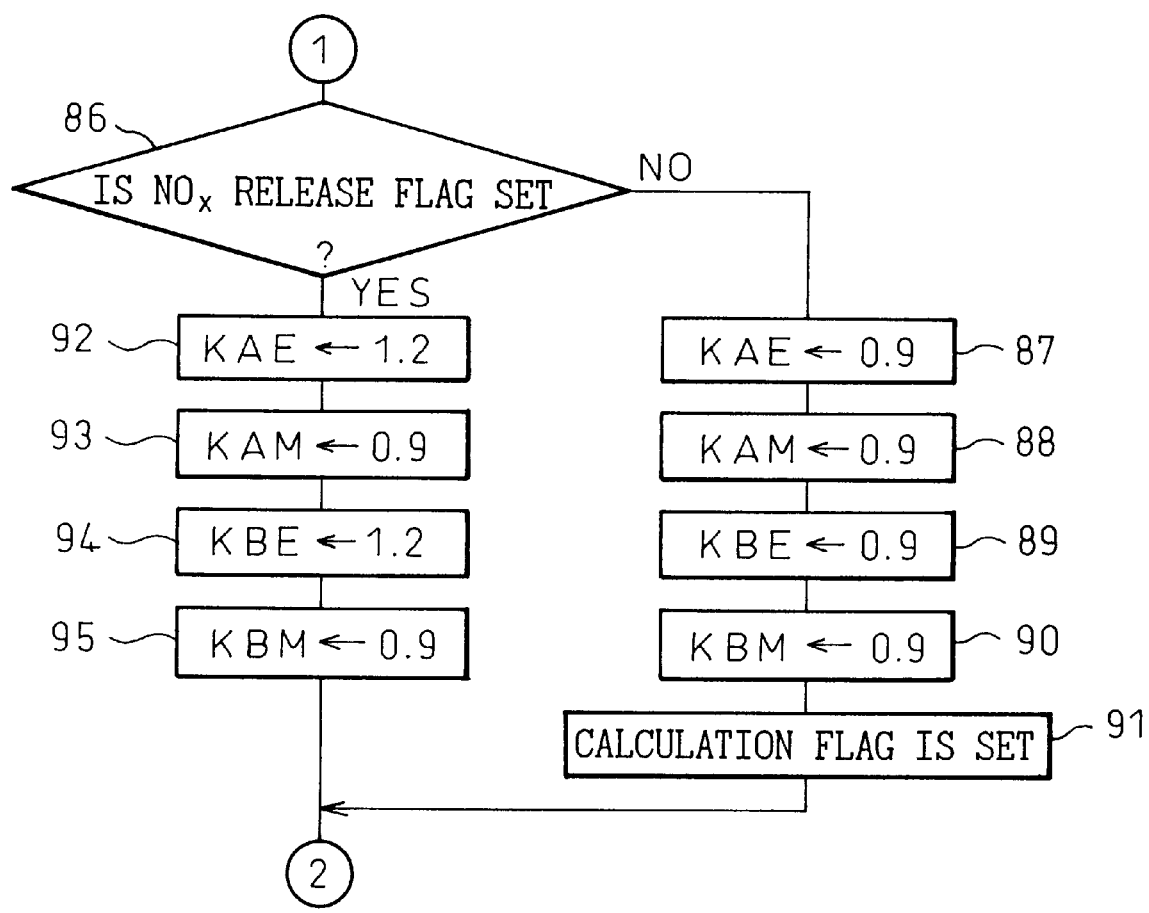
Figure 10:
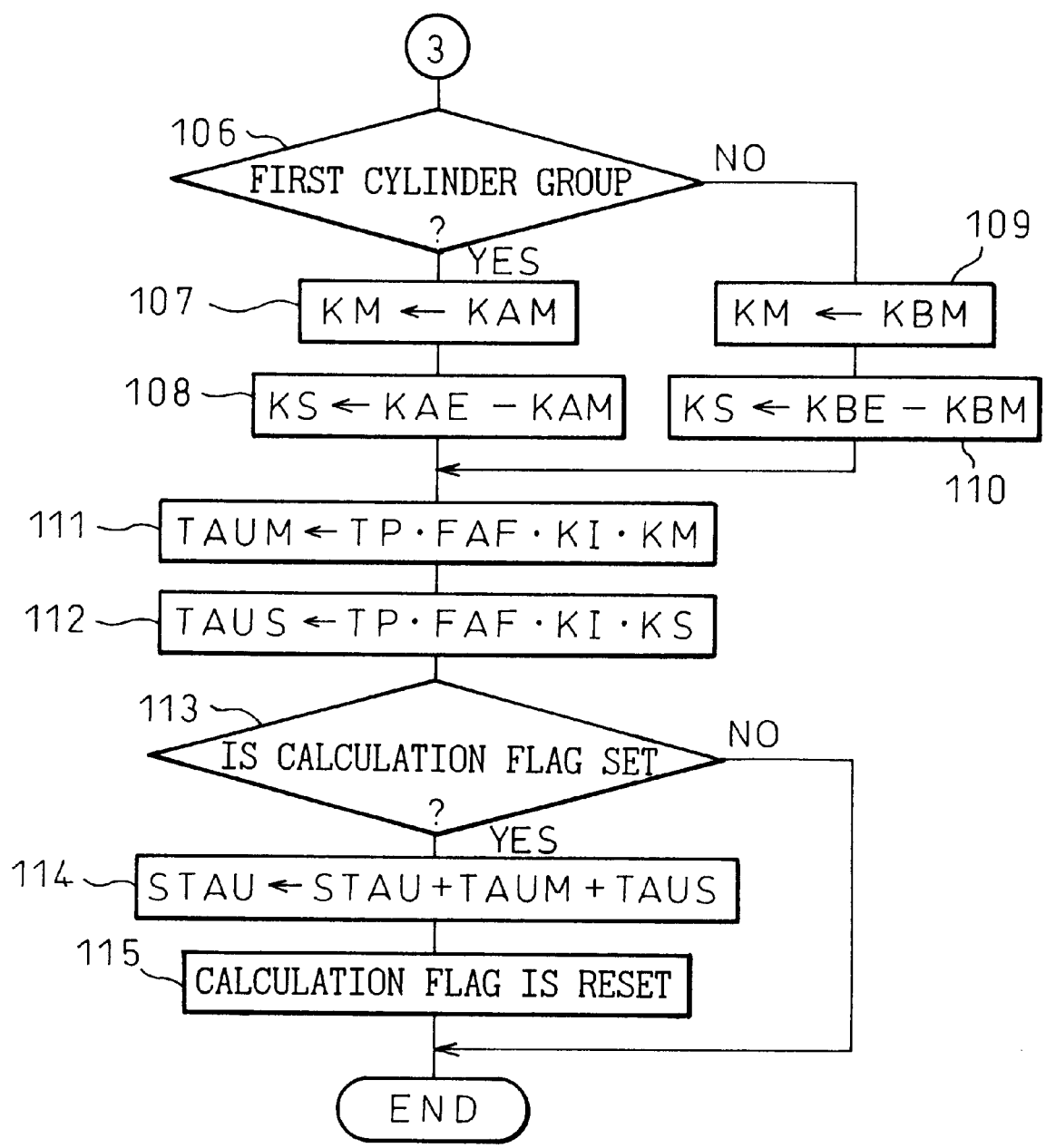

FIGS. 8 through 10 show a routine for calculating the fuel injection time. The routine is executed by interruption every predetermined crank angle.

Referring to FIGS. 8 through 10, first, in step 80, the basic fuel injection time TP is calculated using the map shown in FIG. 3. In the following step 81, it is judged whether the increasing correction coefficient KI is calculated. In the following step 82, it is judged whether the temperature THW of the cooling water of the engine is higher than a predetermined temperature THW1. When THW>THW1, i.e., when the warming up of the engine or the engine starting operation is finished, the routine goes to step 83, where it is judged whether the FB flag is set. When the FB flag is reset, the routine goes to step 84, where the feedback correction coefficient FAF is fixed to 1.0. In the following step 85, it is judged whether the sulphur containing components release flag is set. When the sulphur containing components release flag is reset, the routine goes to step 86, where it is judged whether the $NO_X$ release flag is set. When the $NO_X$ release flag is reset, the routine goes step 87, where the exhaust gas air-fuel ratio correction coefficient KAE for the first cylinder group 1a is set to 0.9. In the following step 88, the main air-fuel ratio correction coefficient KAM for the first cylinder group 1a is set to 0.9. In the following step 89, the exhaust gas air-fuel ratio correction coefficient KBE for the second cylinder group 1b is set to 0.9. In the following step 90, the main air-fuel ratio correction coefficient KBM for the second cylinder group 1b is set to 0.9.

Namely, in this case, the air-fuel ratio of the air-fuel mixture fed to the cylinder of the first cylinder group 1a is made lean because KAM<1.0, and the secondary fuel injection is not performed in the first cylinder group 1a because the secondary air-fuel ratio correction coefficient KS (=KAE−KAM)=0, and the air-fuel ratio of the exhaust gas discharged from the first cylinder group 1a is made lean. Also, the air-fuel ratio of the air-fuel mixture fed to the cylinder of the second cylinder group 1b is made lean because KBM<1.0, and the secondary fuel injection is not performed in the second cylinder group 1b because KS (=KBE−KBM)=0, and the air-fuel ratio of the exhaust gas discharged from the second cylinder group 1b is made lean. Accordingly, at this time, the air-fuel ratio of all the exhaust gas flowing to the $NO_X$ absorbent 12 is made lean.

Then, the routine goes to step 91, where a calculation flag is set. The calculation flag is set when the cumulative fuel injection time must be calculated, and is reset otherwise. Then, the routine jumps to step 106.

Contrarily, when the $NO_X$ release flag is set in step 86, the routine goes to step 92, where the exhaust gas air-fuel ratio correction coefficient KAE for the first cylinder group 1a is set to 1.2. In the following step 93, the main air-fuel ratio correction coefficient KAM for the first cylinder group 1a is set to 0.9. In the following step 94, the exhaust gas air-fuel ratio correction coefficient KBE for the second cylinder group 1b is set to 1.2. In the following step 95, the main air-fuel ratio correction coefficient KBM for the second cylinder group 1b is set to 0.9. Then, the routine jumps to step 106.

Namely, in this case, the air-fuel ratio of the air-fuel mixture fed to the cylinder of the first cylinder group 1a is made rich because KAM>1.0, and the secondary fuel injection is performed in the first cylinder group 1a because KS>0, and the air-fuel ratio of the exhaust gas discharged from the first cylinder group 1a is made rich. Also, the air-fuel ratio of the air-fuel mixture fed to the cylinder of the second cylinder group 1b is made rich because KBM>1.0, and the secondary fuel injection is performed in the second cylinder group 1b because KS>0, and the air-fuel ratio of the exhaust gas discharged from the second cylinder group 1b is made rich. Accordingly, at this time, the air-fuel ratio of the entire exhaust gas flowing to the $NO_X$ absorbent 12 is made rich.

On the other hand, when the sulphur containing components release flag is set in step 85, the routine goes to step 96, where the exhaust gas air-fuel ratio correction coefficient KAE for the first cylinder group 1a is set to 0.9. In the following step 97, the main air-fuel ratio correction coefficient KAM for the first cylinder group 1a is set to 0.9. In the following step 98, the exhaust gas air-fuel ratio correction coefficient KBE for the second cylinder group 1b is set to 1.2. In the following step 99, the main air-fuel ratio correction coefficient KBM for the second cylinder group 1b is set to 0.9. Then, the routine jumps to step 106.

Namely, in this case, the air-fuel ratio of the air-fuel mixture fed to the cylinder of the first cylinder group 1a is made lean because KAM<1.0, and the secondary fuel injection is not performed in the first cylinder group 1a because KS=0, and the air-fuel ratio of the exhaust gas discharged from the first cylinder group 1a is made lean. Also, the air-fuel ratio of the air-fuel mixture fed to the cylinder of the second cylinder group 1b is made rich because KBM>1.0, and the secondary fuel injection is performed in the second cylinder group 1b because KS>0, and the air-fuel ratio of the exhaust gas discharged from the second cylinder group 1b is made rich. Accordingly, at this time, the air-fuel ratio of the entire exhaust gas flowing to the $NO_X$ absorbent 12 is made rich.

On the other hand, when the FB flag is set in step 83, the routine goes to step 100, where the feedback correction coefficient FAF is calculated. Then, the routine goes to step 101. On the other hand, when THW≦THW1 in step 82, i.e., when the warming up of the engine or the engine starting operation is in process, the routine goes to step 105, where the feedback correction coefficient FAF is fixed to 1.0. Then, the routine goes to step 101.

In step 101, the exhaust gas air-fuel ratio correction coefficient KAE for the first cylinder group 1a is set to 1.0. In the following step 102, the main air-fuel ratio correction coefficient KAM for the first cylinder group 1a is also set to 1.0. In the following step 103, the exhaust gas air-fuel ratio correction coefficient KBE for the second cylinder group 1b is also set to 1.0. In the following step 104, the main air-fuel ratio correction coefficient KBM for the second cylinder group 1b is also set to 1.0. Then, the routine jumps to step 106.

Namely, in this case, the air-fuel ratio of the air-fuel mixture fed to the cylinder of the first cylinder group 1a is made stoichiometric because KAM=1.0, and the secondary fuel injection is not performed in the first cylinder group 1a because KS=0, and the air-fuel ratio of the exhaust gas discharged from the first cylinder group 1a is made stoichiometric. Also, the air-fuel ratio of the air-fuel mixture fed to the cylinder of the second cylinder group 1b is also made stoichiometric because KBM=1.0, and the secondary fuel injection is not performed in the second cylinder group 1b because KS=0, and the air-fuel ratio of the exhaust gas discharged from the second cylinder group 1b is made stoichiometric. Accordingly, at this time, the air-fuel ratio of the entire exhaust gas flowing to the $NO_X$ absorbent 12 is made stoichiometric.

In step 106, it is judged whether the fuel injection time to be found in the present processing cycle is for the first cylinder group 1a. When the fuel injection time for the first cylinder group 1a must be found in the present processing cycle, the routine goes to step 107, where KAM is memorized as the main air-fuel ratio correction coefficient KM. In the following step 108, the secondary air-fuel ratio correction coefficient KS is calculated as the difference (KAE−KAM) between KAE and KAM. Then, the routine goes to step 111. Contrarily, when the fuel injection time for the second cylinder group 1b must be found in the present processing cycle, the routine goes to step 109, where KBM is memorized as the main air-fuel ratio correction coefficient KM. In the following step 110, the secondary air-fuel ratio correction coefficient KS is calculated as the difference (KBE−KBM) between KBE and KBM. Then, the routine goes to step 111.

In step 111, the main fuel injection time TAUM is calculated based on the following equation.

$$TAUM=TP·FAF·KI·KM$$

In the following step 112, the secondary fuel injection time TAUS is calculated based on the following equation.

$$TAUS=TP·FAF·KI·KS$$

The fuel injector 7 injects fuel by TAUM in the main fuel injection, and by TAUS in the secondary fuel injection. In the following step 113, it is judged whether the calculation flag is set. When the calculation flag is reset, the processing cycle is ended. Contrarily, when the calculation flag is set, the routine goes to step 114, where the cumulative fuel injection time STAU is calculated.

$$STAU=STAU+TAUM+TAUS$$

In the following step 115, the calculation flag is reset. Then, the processing cycle is ended.

Figure 11:
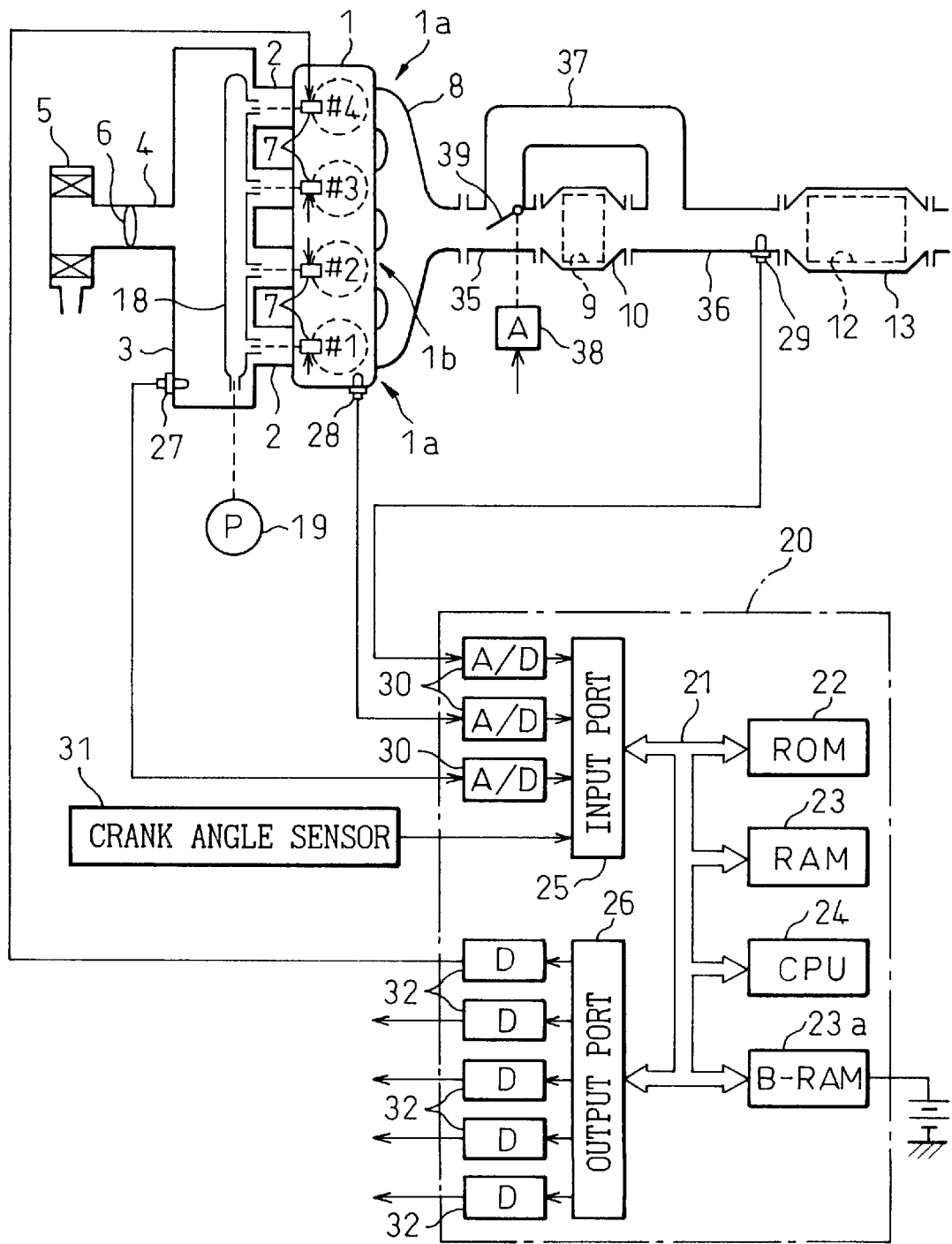
FIG. 11 is a general view of an engine according to another embodiment of the present invention.

FIG. 11 shows another embodiment.

Also in the present embodiment, the cylinders of the engine are divided to the first and the second cylinder groups 1a and 1b. However, the first and the second cylinder groups 1a and 1b are connected to a common exhaust manifold 8, and the exhaust manifold 8 is connected, via an exhaust pipe 35, to the casing 10 housing the start catalyst, such as a three-way catalyst 9, therein. Namely, the single start catalyst 9 is provided in the present embodiment. The casing 10 is connected, via an exhaust pipe 36, to the casing 13 housing the exhaust gas purifying catalyst such as the $NO_X$ absorbent 12 therein. Further, as shown in FIG. 11, there is provided a bypass pipe 37 connecting the exhaust pipes 35 and 36 to each other. A bypass valve 39 is arranged at the inlet of the bypass pipe 37, and is driven by an actuator 38. The bypass valve 39 is usually closed. When the bypass valve 39 is closed, the exhaust manifold 8 communicates with the casing 10 and is prevented from communicating with the bypass pipe 37. Thus, all of the exhaust gas discharged from the engine flows through the start catalyst 9. Contrarily, when the bypass valve 39 is opened, the exhaust manifold 8 communicates with the bypass pipe 37 and is prevented from communicating with the casing 10. Thus, all of the exhaust gas discharged from the engine flows through the bypass pipe 37 bypassing the start catalyst 9 and, then, flows to the $NO_X$ absorbent 12. In this way, the bypass valve 39 communicates the exhaust manifold 8 selectively with one of the bypass pipe 37 and the casing 10. Note that the actuator 38 is connected, via the drive circuit 32, to the output port 26 of the ECU 20, and is controlled based on the output signal from the ECU 20.

Also, in the present embodiment, as in the above-mentioned embodiment, the air-fuel ratio of the exhaust gas of the first cylinder group 1a is made lean, the air-fuel ratio of the exhaust gas of the second cylinder group 1b is made rich, and the air-fuel ratio of the entire exhaust gas flowing to the $NO_X$ absorbent 12 is made rich, when the sulphur containing components must be released from the $NO_X$ absorbent 12. At this time, the bypass valve 39 is opened. As a result, the exhaust gas of the first cylinder group 1a including the rich oxygen and the exhaust gas of the second cylinder group 1b including the rich HC are prevented from flowing to the start catalyst 9 simultaneously. This suppresses the amount of oxygen and HC to be consumed in the start catalyst 9 and, therefore, large amounts of oxygen and HC are fed to the $NO_X$ absorbent 12. Accordingly, the temperature of the $NO_X$ absorbent 12 is surely increased.

Figure 12:
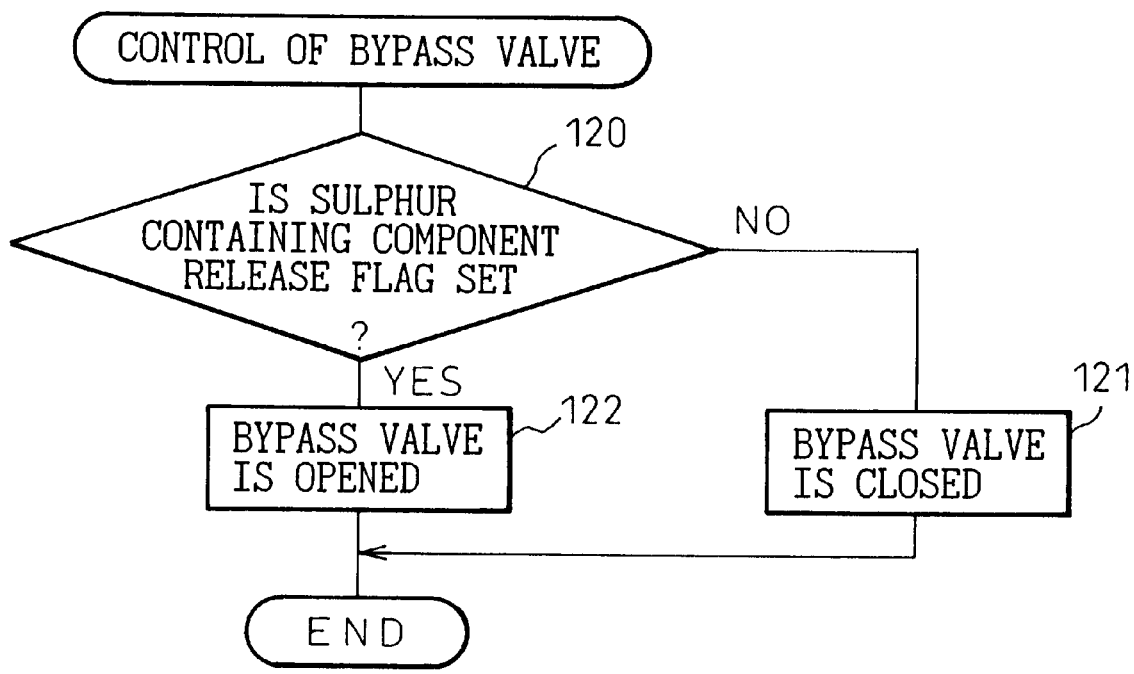
FIG. 12 shows a flowchart for controlling the bypass valve, according to the embodiment shown in FIG. 11.

FIG. 12 shows a routine for controlling the bypass valve 39. The routine is executed by interruption every predetermined time. Note that the interruption routine shown in FIGS. 4 to 6 and the routine for calculation of the fuel injection time shown in FIGS. 8 to 10 are executed.

Referring to FIG. 12, first, in step 120, it is judged whether the sulphur containing components release flag, which is set or reset in the routine shown in FIGS. 4 to 6, is set. When the sulphur containing components release flag is reset, the routine goes to step 121, where the bypass valve 39 is closed. Namely, the bypass pipe 37 is shut off and the exhaust gas discharged from the engine flows through the start catalyst 9. Contrarily, when the sulphur containing components release flag is set, the routine goes to step 122, where the bypass valve 39 is opened. Namely, the bypass pipe 37 is opened and the exhaust gas discharged from the engine bypasses the start catalyst 9 and flows through the bypass pipe 37. Note that the other structure and operation of the device of the present embodiment are the same as those of the above-mentioned embodiment and, thus, explanations thereof are omitted.

In the embodiments mentioned above, each cylinder group is formed of a plurality of cylinders. Alternatively, each cylinder group may be formed by a single cylinder. Further, while the cylinders of the engine are divided into two cylinder groups in the preceding embodiments, the cylinders may be divided into three or more cylinder groups. For example, in a case where the cylinders are divided into three cylinder groups in the embodiment shown in FIG. 11, the air-fuel ratio of the exhaust gas of the first cylinder group may be made lean, the air-fuel ratio of the exhaust gas of the second cylinder group may be made rich, the air-fuel ratio of the exhaust gas of the third cylinder group may be made stoichiometric, and the air-fuel ratio of the entire exhaust gas flowing to the $NO_X$ absorbent 12 may be made rich, when the sulphur containing components must be released from the $NO_X$ absorbent 12.

Figure 13:
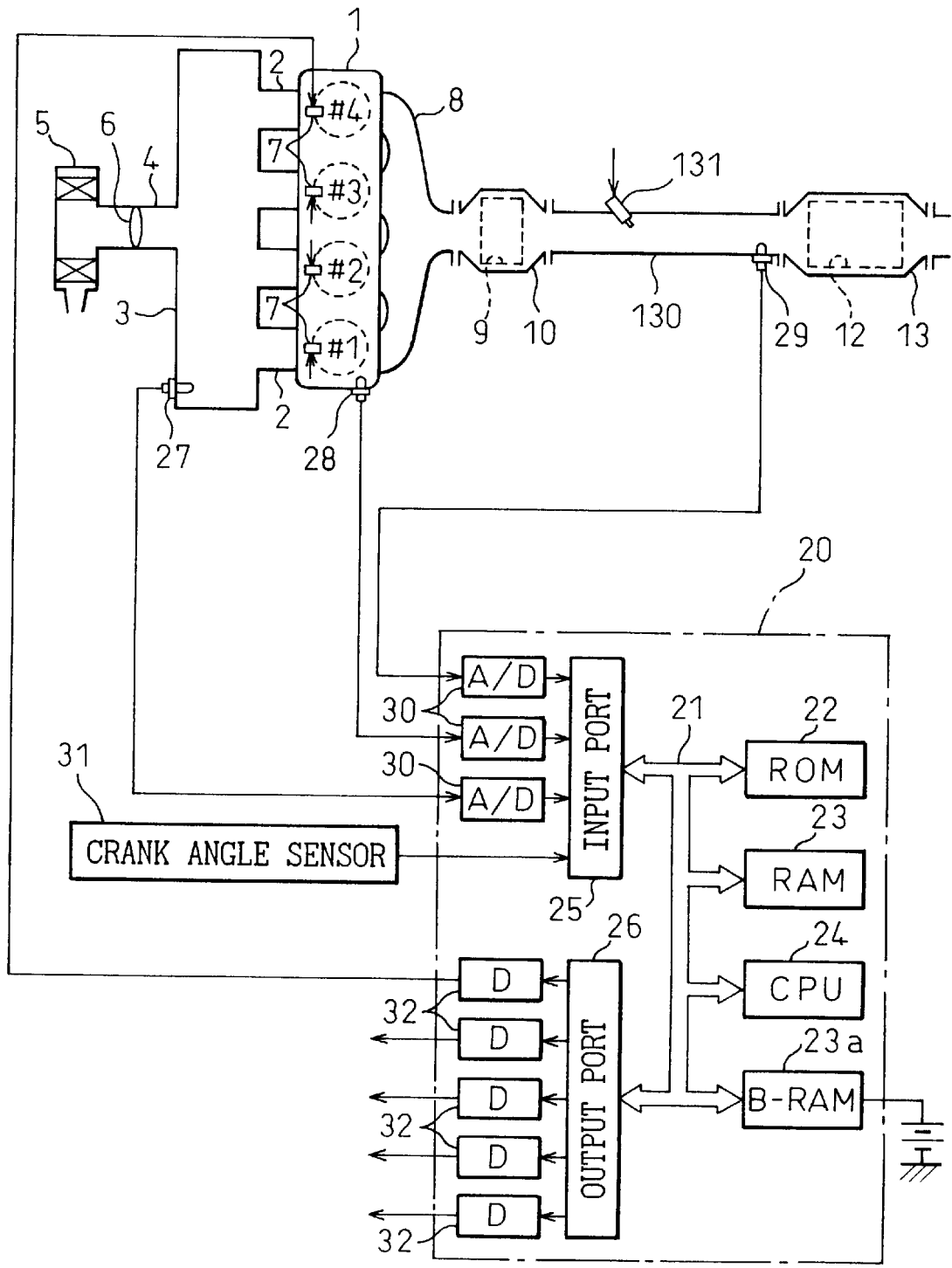
FIG. 13 is a general view of an engine according to another embodiment of the present invention.

FIG. 13 shows another embodiment.

Referring to FIG. 13, the cylinders are connected, via the common exhaust manifold 8, to the casing 10 housing the start catalyst such as the three-way catalyst 9 therein, and the casing 10 is connected, via an exhaust pipe 130, to the casing 13 housing the exhaust gas purifying catalyst such as the $NO_X$ absorbent 12 therein. A secondary fuel injector 131 which is able to feed the secondary fuel to the $NO_X$ absorbent 12 is arranged in the exhaust pipe 130, and is connected, via an additional fuel pump (not shown), to the fuel tank which is common to the fuel injector 7. The secondary fuel injector 130 is connected, via the drive circuit 32, to the output port 26 of the ECU 20, and is controlled based on the output signal from the ECU 20.

In the present embodiment, the cylinders are not divided into cylinder groups. The air-fuel ratios of the air-fuel mixture fed to the cylinders or the air-fuel ratios of the exhaust gas discharged from the cylinders are identical to each other. Further, in each cylinder, only the main fuel injection is performed and the secondary fuel injection by the fuel injector 7 is not performed.

Also, in the present embodiment, the air-fuel ratio of the exhaust gas flowing to the $NO_X$ absorbent 12 is usually made lean, and is temporarily made rich when the absorbed $NO_X$ amount in the $NO_X$ absorbent 12 becomes larger than the constant value. Further, the air-fuel ratio of the exhaust gas flowing to the $NO_X$ absorbent 12 is temporarily made rich with the $NO_X$ absorbent 12 being heated when the $NO_X$ absorbent 12 is judged to be poisoned by the sulphur containing components and the condition for the release of the sulphur containing components is satisfied, and is temporarily made stoichiometric when the release of the sulphur containing components is finished or temporarily stopped.

When the air-fuel ratio of the exhaust gas flowing to the $NO_X$ absorbent 12 must be made lean, the air-fuel ratio of the air-fuel mixture fed to the cylinder is made lean and the secondary fuel injection by the secondary fuel injector 131 is stopped. Contrarily, when the air-fuel ratio of the exhaust gas flowing to the $NO_X$ absorbent 12 must be made rich, the secondary fuel injection by the secondary fuel injector 131 is performed while the air-fuel ratio of the air-fuel mixture fed to the cylinder is kept lean. In this case, the exhaust gas from the engine includes the rich oxygen. On the other hand, the secondary fuel is fed and mixed with the exhaust gas including the rich oxygen in the exhaust passage downstream of the start catalyst 9. Thus, a large amount of oxygen and HC (fuel) is fed to the $NO_X$ absorbent 12 and, therefore, the temperature of the $NO_X$ absorbent 12 is rapidly increased to a required temperature. At this time, when the amount of the secondary fuel is controlled to make the air-fuel ratio of the exhaust gas flowing to the $NO_X$ absorbent 12 rich, the sulphur containing components are released from the $NO_X$ absorbent 12.

In the present embodiment, the exhaust gas air-fuel ratio correction coefficient KE and the main air-fuel ratio correction coefficient KM are identical for all cylinders. The main fuel injection time TAUM for the fuel injector 7 is calculated as in the preceding embodiments. Contrarily, the secondary fuel injection time TAUSS for the secondary fuel injector 131 is calculated based on the following equation.

$$TAUSS = TP \cdot FAF \cdot KI \cdot KSS$$

where KSS represents the secondary air-fuel ratio correction coefficient for the secondary fuel injector 131, and is obtained as a difference (KE−KM) between KE and KM.

Figure 14:
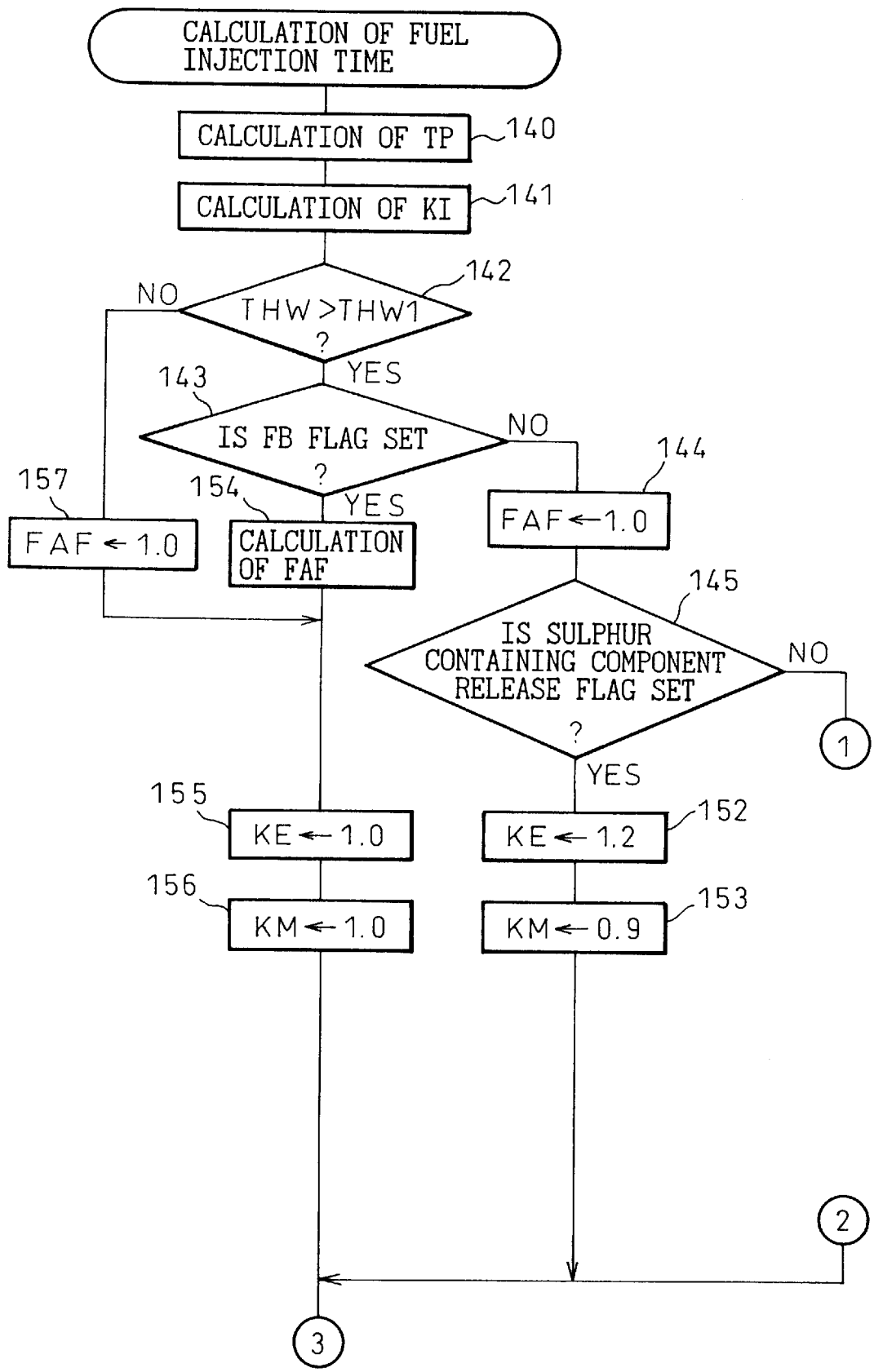
FIGS. 14 to 16 show a flowchart for calculating the fuel injection time, according to the embodiment shown in FIG. 13.
Figure 15:
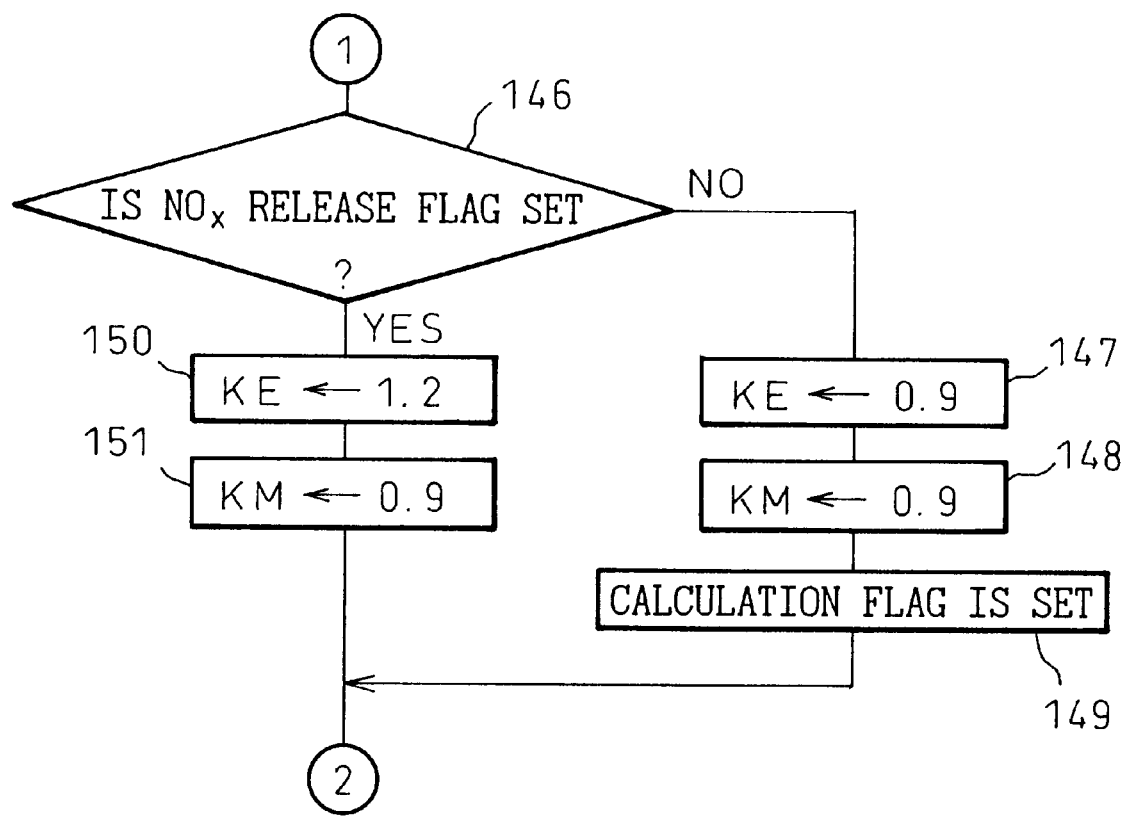
Figure 16:
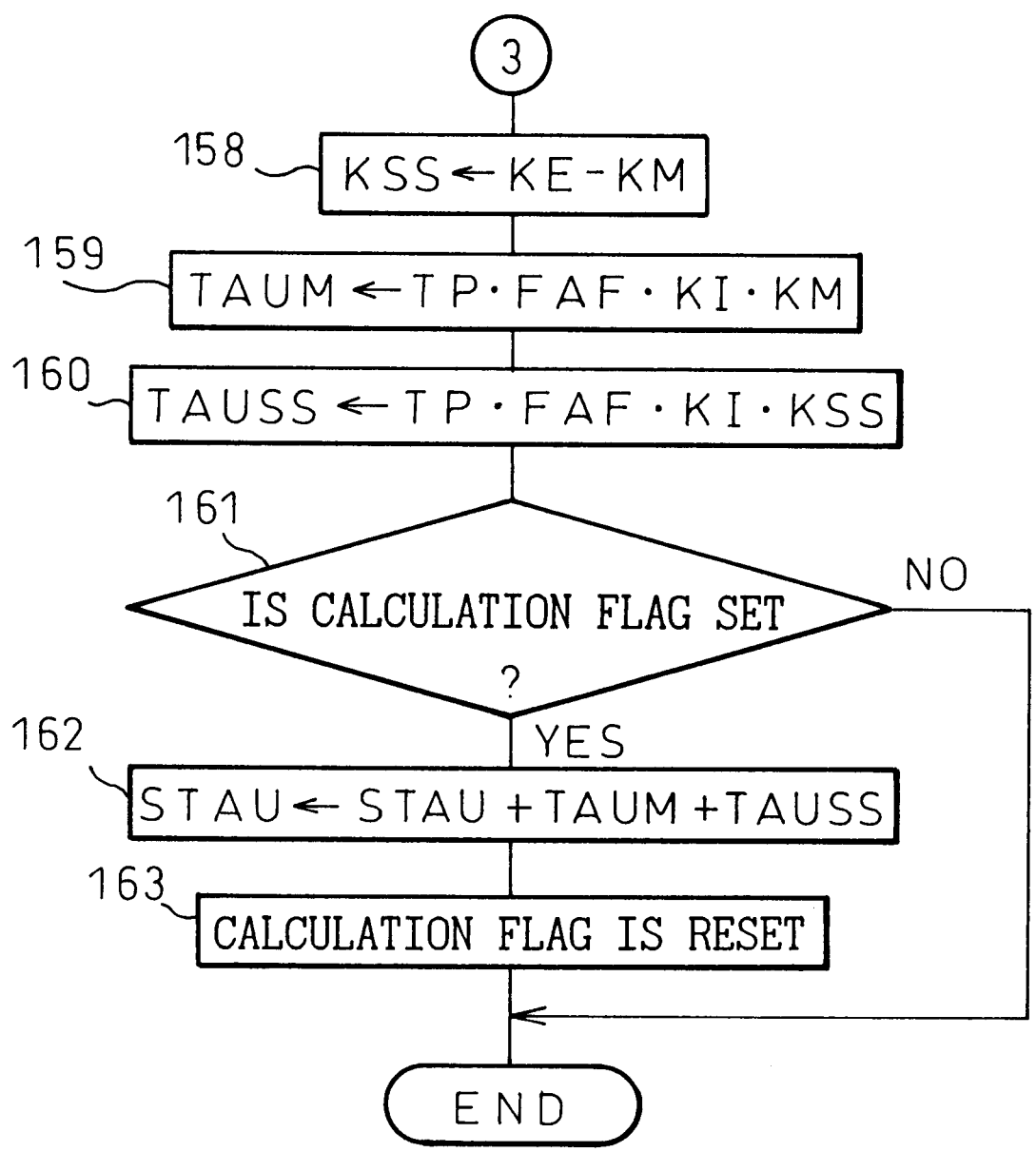

FIGS. 14 to 16 show a routine for calculating the fuel injection time, according to the present embodiment. The routine is executed by interruption every predetermined crank angle. Note that the interruption routine shown in FIGS. 4 to 6 is also executed in the present embodiment.

Referring to FIGS. 14 to 16, first, in step 140, the basic fuel injection time TP is calculated. In the following step 141, the increasing correction coefficient KI is calculated. In the following step 142, it is judged whether the cooling water temperature THW is higher than the predetermined temperature THW1. When THW>THW1, the routine goes to step 143, where it is judged whether the FB flag is set. When the FB flag is reset, the routine goes to step 144, where the feedback correction coefficient FAF is fixed to 1.0. In the following step 145, it is judged whether the sulphur containing components release flag is set. When the sulphur containing components release flag is reset, the routine goes to step 146, where it is judged whether the $NO_X$ release flag is set. When the $NO_X$ release flag is reset, the routine goes steps 147 and 148, where the exhaust gas air-fuel ratio correction coefficient KE and the main air-fuel ratio correction coefficient KM are set to 0.9, respectively.

Namely, in this case, the air-fuel ratio of the air-fuel mixture fed to the cylinder is made lean because KM<1.0, and the secondary fuel injection is not performed because the secondary air-fuel ratio correction coefficient KSS (=KE−KM)=0, and the air-fuel ratio of the exhaust gas flowing to the $NO_X$ absorbent 12 is made lean.

Then, the routine goes to step 149, where the calculation flag is set. Then, the routine jumps to step 158.

Contrarily, when the $NO_X$ release flag is set in step 146, the routine goes to steps 150 and 151, where KE and KM are set to 1.2 and 0.9, respectively. Then, the routine jumps to step 158.

Namely, in this case, the air-fuel ratio of the air-fuel mixture fed to the cylinder is made lean because KM<1.0, and the secondary fuel injection is performed because KSS>0, and the air-fuel ratio of the exhaust gas flowing to the $NO_X$ absorbent 12 is made rich.

On the other hand, when the sulphur containing components release flag is set in step 145, the routine goes to steps 152 and 153, where KE and KM are set to 1.2 and 0.9, respectively. Then, the routine jumps to step 158.

Namely, in this case, the air-fuel ratio of the air-fuel mixture fed to the cylinder is made lean because KM<1.0, and the secondary fuel injection is performed because KSS>0, and the air-fuel ratio of the exhaust gas flowing to the $NO_X$ absorbent 12 is made rich.

On the other hand, when the FB flag is set in step 143, the routine goes to step 154, where the feedback correction coefficient FAF is calculated. Then, the routine goes to steps 155 and 156. On the other hand, when THW<THW1 in step 142, the routine goes to step 157, where the feedback correction coefficient FAF is fixed to 1.0. Then, the routine goes to steps 155 and 156.

In steps 155 and 156, the exhaust gas air-fuel ratio correction coefficient KE and the main air-fuel ratio correction coefficient KM are set to 1.0, respectively. Then, the routine goes to step 158.

Namely, in this case, the air-fuel ratio of the air-fuel mixture fed to the cylinder are made stoichiometric because KM=1.0, and the secondary fuel injection is not performed because KSS=0, and the air-fuel ratio of the exhaust gas flowing to the $NO_X$ absorbent 12 is made stoichiometric.

In step 158, the secondary air-fuel ratio correction coefficient KSS is calculated as the difference (KE−KM). In the following step 159, the main fuel injection time TAUM is calculated (TAUM=TP·FAF·KI·KM). In the following step 160, the secondary fuel injection time TAUSS is calculated (TAUSS=TP·FAF·KI·KSS). The fuel injector 7 injects fuel by TAUM and the secondary fuel injector 131 injects fuel by TAUSS. In the following step 161, it is judged whether the calculation flag is set. When the calculation flag is reset, the processing cycle is ended. Contrarily, when the calculation flag is set, the routine goes to step 162, where the cumulative fuel injection time STAU is calculated (STAU=STAU+TAUM+TAUSS). In the following step 163, the calculation flag is reset. Then, the processing cycle is ended.

Note that the other structures and operation of the device of the present embodiment are the same as those of the above-mentioned embodiments and, thus, explanations thereof are omitted.

Figure 17:
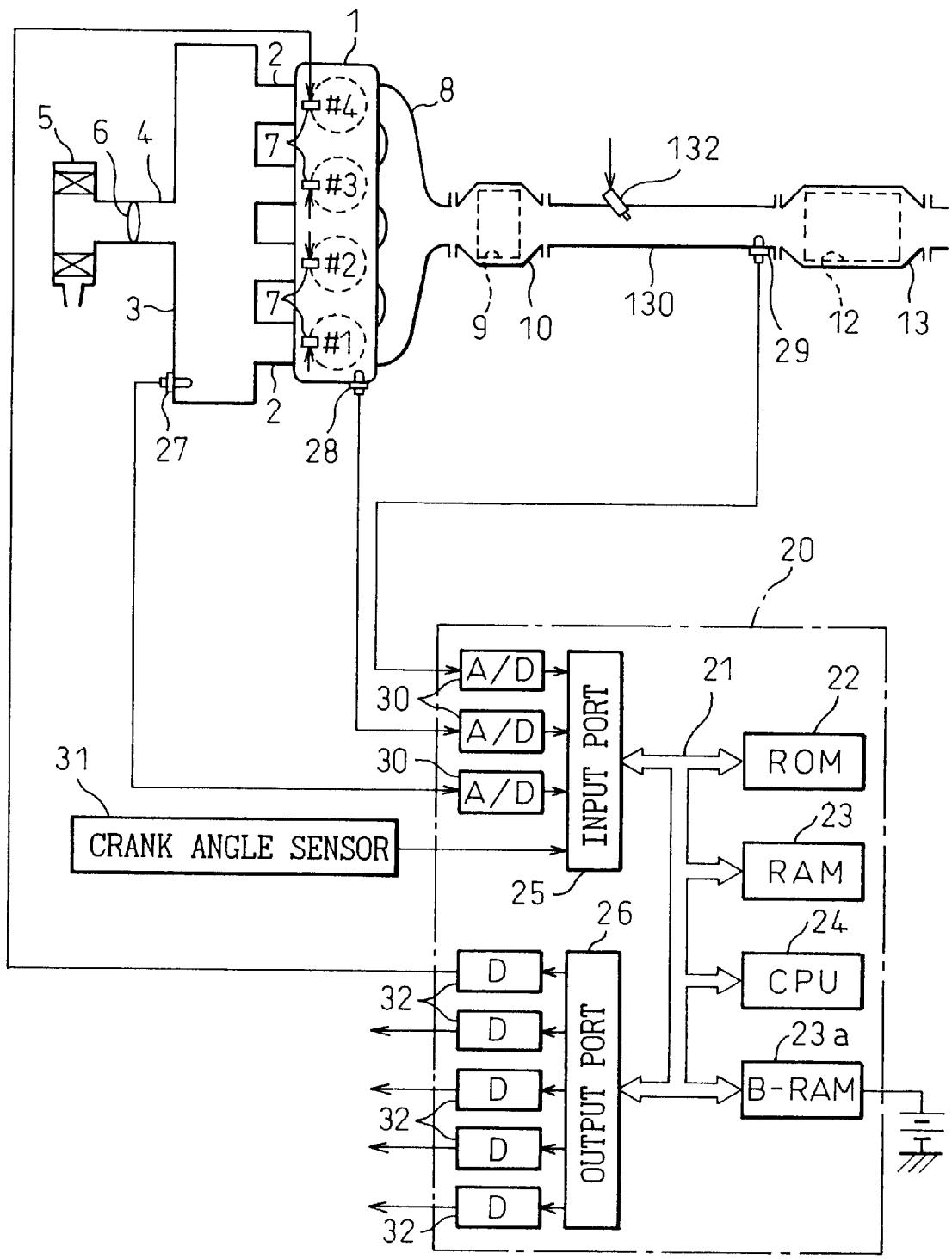
FIG. 17 is a general view of an engine according to another embodiment of the present invention.

FIG. 17 shows another embodiment.

The present embodiment is different from the embodiment shown in FIG. 13 in the point that the secondary fuel injector 131 arranged in the exhaust pipe 30 is substituted by a secondary air injector 132 which is able to feed the secondary air to the $NO_X$ absorbent 12. The secondary air injector 132 is connected, via the drive circuit 32, to the output port 26 of the ECU 20, and is controlled based on the output signal from the ECU 20.

When the air-fuel ratio of the exhaust gas flowing to the $NO_X$ absorbent 12 must be made lean, the air-fuel ratio of the air-fuel mixture fed to the cylinder is made lean and the secondary air injection by the secondary air injector 132 is stopped. Contrarily, when the air-fuel ratio of the exhaust gas flowing to the $NO_X$ absorbent 12 must be made rich to release $NO_X$ from the $NO_X$ absorbent 12, the air-fuel ratio of the air-fuel mixture fed to the cylinder is changed to rich, while the secondary air injection by the secondary air injector 132 is still stopped. When the air-fuel ratio of the exhaust gas flowing togas flowing to the $NO_X$ absorbent 12 must be made rich to release the sulphur containing components from the $NO_X$ absorbent 12, the air-fuel ratios of the air-fuel mixture fed to the cylinder is changed to rich, and the secondary air injection by the secondary air injector 132 is performed. In this case, the exhaust gas from the engine includes the rich HC. On the other hand, the secondary air is fed and mixed with the exhaust gas including the rich HC in the exhaust passage downstream of the start catalyst 9. Thus, a large amount of oxygen and HC is fed to the $NO_X$ absorbent 12 and, therefore, the temperature of the $NO_X$ absorbent 12 is rapidly increased to a required temperature. At this time, the air injection time of the secondary air injector 132 is controlled to increase the temperature of the $NO_X$ absorbent 12 rapidly and to make the air-fuel ratio of the exhaust gas flowing to the $NO_X$ absorbent 12 rich and, thereby, the sulphur containing components is released from the $NO_X$ absorbent 12. For example, the air-fuel ratio of the air-fuel mixture fed to the cylinder is set to 11.0 and the air-fuel ratio of the exhaust gas flowing to the $NO_X$ absorbent 12 is set to 14.0 using the secondary air.

Figure 18:
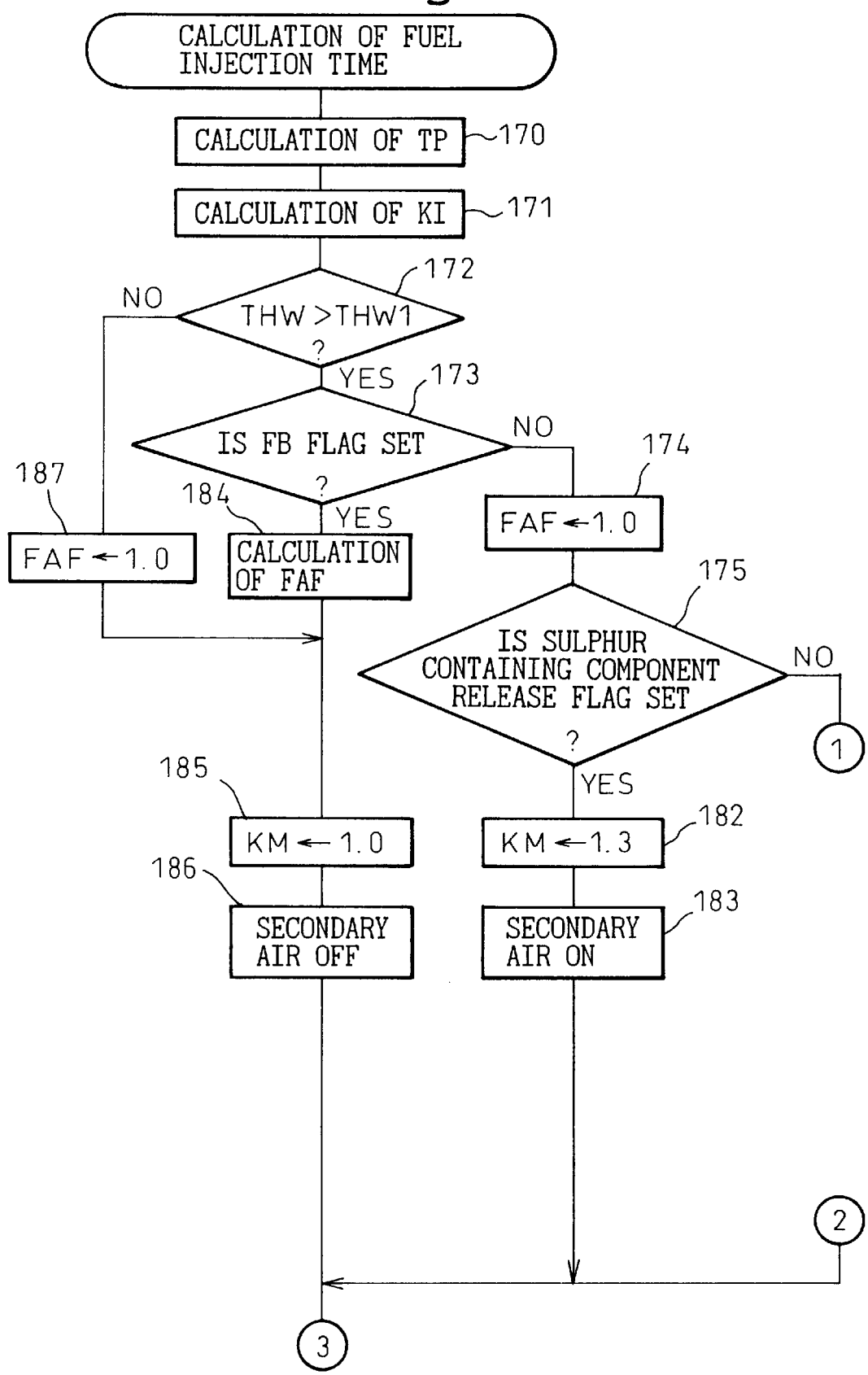
FIGS. 18 to 20 show a flowchart for calculating the fuel injection time, according to the embodiment shown in FIG. 17.
Figure 19:
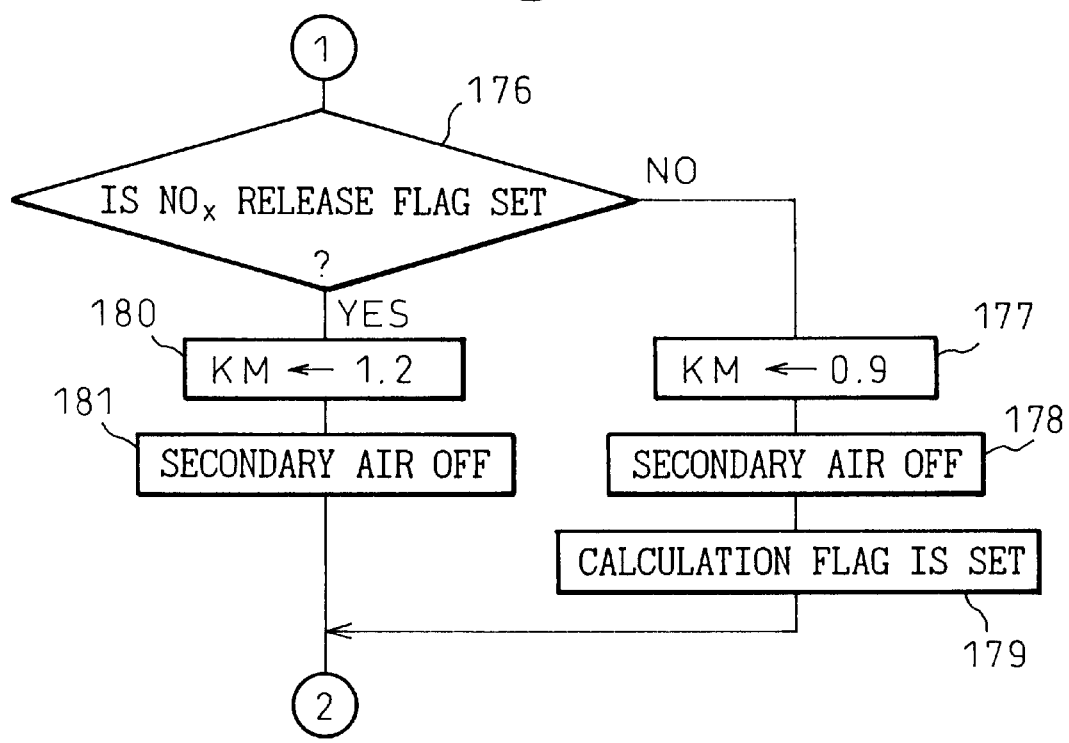
Figure 20:
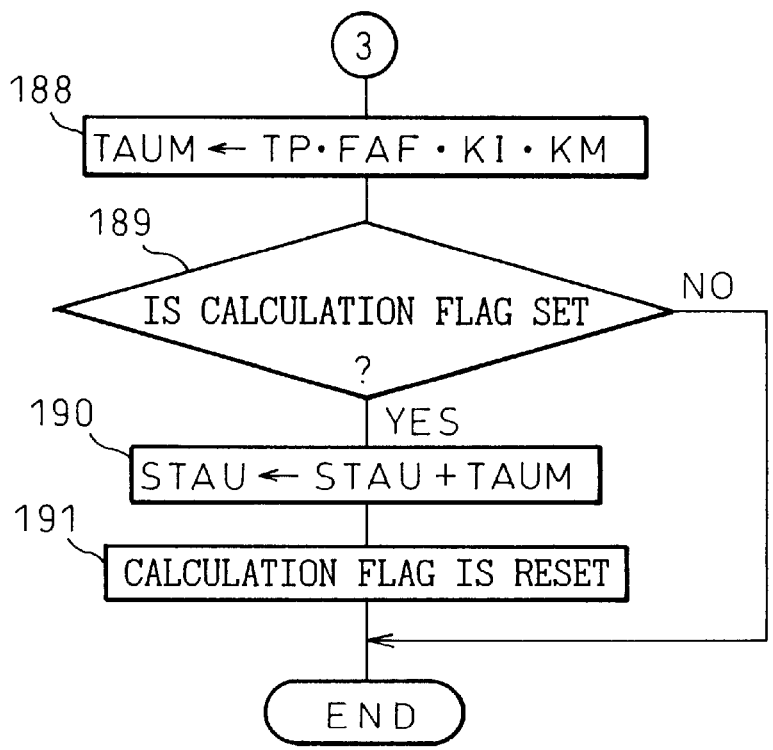

FIGS. 18 to 20 show a routine for calculating the fuel injection time, according to the present embodiment. The routine is executed by interruption every predetermined crank angle. Note that the interruption routine shown in FIGS. 4 to 6 is also executed in the present embodiment.

Referring to FIGS. 18 to 20, first, in step 170, the basic fuel injection time TP is calculated. In the following step 171, the increasing correction coefficient KI is calculated. In the following step 172, it is judged whether the cooling water temperature THW is higher than the predetermined temperature THW1. When THW>THW1, the routine goes to step 173, where it is judged whether the FB flag is set. When the FB flag is reset, the routine goes to step 174, where the feedback correction coefficient FAF is fixed to 1.0. In the following step 175, it is judged whether the sulphur containing components release flag is set. When the sulphur containing components release flag is reset, the routine goes to step 176, where it is judged whether the $NO_X$ release flag is set. When the $NO_X$ release flag is reset, the routine goes step 177, where the main air-fuel ratio correction coefficient KM is set to 0.9. In the following step 179, the secondary air injection by the secondary air injector 132 is stopped (OFF).

Namely, in this case, the air-fuel ratio of the air-fuel mixture fed to the cylinder is made lean because KM<1.0, and the secondary air injection is not performed, and the air-fuel ratio of the exhaust gas flowing to the $NO_X$ absorbent 12 is made lean.

Then, the routine goes to step 179, where the calculation flag is set. Then, the routine jumps to step 188.

Contrarily, when the $NO_X$ release flag is set in step 176, the routine goes to step 180, where KM is set to 1.2. In the following step 181, the secondary air injection is stopped. Then, the routine jumps to step 188.

Namely, in this case, the air-fuel ratio of the air-fuel mixture fed to the cylinder is made rich because KM<1.0, the secondary air injection is not performed, and the air-fuel ratio of the exhaust gas flowing to the $NO_X$ absorbent 12 is made rich.

On the other hand, when the sulphur containing components release flag is set in step 175, the routine goes to step 182, where the KM is set to 1.3. In the following step 183, the secondary air injection is performed (ON). Then, the routine jumps to step 188.

Namely, in this case, the air-fuel ratio of the air-fuel mixture fed to the cylinder is made rich because KM<1.0, the secondary air injection is performed, and the air-fuel ratio of the exhaust gas flowing to the $NO_X$ absorbent 12 is made rich.

On the other hand, when the FB flag is set in step 173, the routine goes to step 184 where the feedback correction coefficient FAF is calculated. Then, the routine goes to steps 185 and 186. On the other hand, when THW≦THW1 in step 172, the routine goes to step 187, where the feedback correction coefficient FAF is fixed to 1.0. Then, the routine goes to steps 185 and 186.

In step 185, KM is set to 1.0. In the following step 186, the secondary air injection is stopped. Then, the routine goes to step 188.

Namely, in this case, the air-fuel ratio of the air-fuel mixture fed to the cylinder is made stoichiometric because KM=1.0, and the secondary air injection is not performed, and the air-fuel ratio of the exhaust gas flowing to the $NO_X$ absorbent 12 is made stoichiometric.

In step 188, the main fuel injection time TAUM is calculated. In the following step 189, it is judged whether the calculation flag is set. When the calculation flag is reset, the processing cycle is ended. Contrarily, when the calculation flag is set, the routine goes to step 190, where the cumulative fuel injection time STAU is calculated (STAU=STAU+TAUM). In the following step 191, the calculation flag is reset. Then, the processing cycle is ended.

In the embodiments mentioned above, the exhaust gas purifying catalyst 12 is formed by the $NO_X$ absorbent. Alternatively, the exhaust gas purifying catalyst 12 may be formed by the three-way catalyst 12 or a catalyst having a porous carrier. Further, in the embodiments mentioned above, it is judged whether the catalyst 12 is poisoned by the sulphur containing components and, when the catalyst 12 is judged to be poisoned, the reactivation of the catalyst 12 is performed. Alternatively, it may be judged whether the catalyst 12 is poisoned by the catalytic function reducing material such as the soluble organic fraction (SOF) and lead Pb and, when the catalyst 12 is judged to be poisoned, the reactivation of the catalyst 12 may be performed.

According to the present invention, it is possible to provide a device for purifying an exhaust gas of an engine capable of reactivating the exhaust gas purifying catalyst sufficiently, while ensuring good exhaust gas purification at the start of the engine.

While the invention has been described by reference to specific embodiments chosen for purposes of illustration, it should be apparent that numerous modifications could be made thereto by those skilled in the art without departing from the basic concept and scope of the invention.

We claim:

1. A device for purifying the exhaust gas of an engine having an exhaust passage, the device comprising:
    an exhaust gas purifying catalyst arranged in the exhaust passage;
    a start catalyst arranged in the exhaust passage upstream of the exhaust gas purifying catalyst;
    means for forming a gas including oxygen;
    means for forming a gas including a reducing agent;
    means for forming at least one of the gas including oxygen and the gas including the reducing agent from the exhaust gas of the engine;
    means for mixing the gas including oxygen and the gas including the reducing agent and feeding the gas mixture to the exhaust gas purifying catalyst without the gas mixture flowing into the start catalyst;
    judging means for judging whether the exhaust gas purifying catalyst is poisoned, wherein a reactivation of the exhaust gas purifying catalyst is performed when the exhaust gas is judged to be poisoned; and
    means for obtaining a cumulative fuel amount of the fuel fed to the engine during the usual engine operation, wherein the exhaust gas purifying catalyst is judged to be poisoned when the cumulative fuel amount is larger than a predetermined amount.

2. A device according to claim 1, wherein, when the reactivation of the exhaust gas purifying catalyst must be performed, the gas including oxygen and the gas including the reducing agent are formed and fed to the exhaust gas purifying catalyst so that the oxygen and the reducing agent react with each other to heat the exhaust gas purifying catalyst to reactivate the exhaust gas purifying catalyst.

3. A device according to claim 2, further comprising means for controlling the air-fuel ratio of the exhaust gas flowing to the exhaust gas purifying catalyst, and wherein the air-fuel ratio of the exhaust gas flowing to the exhaust gas purifying catalyst is made rich when the reactivation of the exhaust gas purifying catalyst must be performed.

4. A device according to claim 3, wherein the exhaust gas purifying catalyst comprises a $NO_X$ absorbent, the $NO_X$ absorbent absorbing $NO_X$ therein when the air-fuel ratio of the inflowing exhaust gas is lean, and releasing the absorbed $NO_X$ therefrom when the oxygen concentration in the inflowing exhaust gas becomes lower, and wherein the reactivation of the $NO_X$ absorbent is performed when the $NO_X$ absorbent is poisoned by sulphur containing components.

5. A device according to claim 4, wherein the air-fuel ratio of the exhaust gas flowing to the $NO_X$ absorbent is made lean during the usual engine operation, and wherein the air-fuel ratio of the exhaust gas flowing to the $NO_X$ absorbent is made stoichiometric temporarily when the reactivation of the $NO_X$ absorbent must be stopped.

6. A device according to claim 5, wherein a time in which the air-fuel ratio of the exhaust gas flowing to the $NO_X$ absorbent must be made stoichiometric becomes longer as the amount of the exhaust gas flowing through the $NO_X$ absorbent during the previous reactivation of the $NO_X$ absorbent became larger.

7. A device according to claim 4, wherein the air-fuel ratio of the exhaust gas flowing through the $NO_X$ absorbent is made temporarily rich to release the absorbed $NO_X$ from the $NO_X$ absorbent and reduce the $NO_X$.

8. A device according to claim 4, further comprising means for finding the amount of the reducing agent fed to the $NO_X$ absorbent during the reactivation of the $NO_X$ absorbent, wherein the reactivation of the $NO_X$ absorbent is finished when the amount of the reducing agent fed to the $NO_X$ absorbent is larger than a predetermined amount.

9. A device according to claim 4, wherein the $NO_X$ absorbent is comprised of at least one substance selected from alkali metals including potassium, sodium, lithium, and cesium, alkali earth metals including barium and calcium, rare earth metals including lanthanum and yttrium, and of precious metals including platinum, palladium, rhodium, and iridium, which are carried on a carrier.

10. A device according to claim 2, wherein the air-fuel ratio of the exhaust gas flowing to the exhaust gas purifying catalyst is made lean during the usual engine operation.

11. A device according to claim 1, wherein the judging means judges whether the exhaust gas purifying catalyst is poisoned by at least one of sulphur containing components, a soluble organic fraction, and lead.

12. A device according to claim 1, further comprising means for detecting the temperature of the exhaust gas purifying catalyst, wherein the reactivation of the exhaust gas purifying catalyst is performed when the exhaust gas purifying catalyst is judged to be poisoned and the temperature of the exhaust gas purifying catalyst is higher than a predetermined temperature.

13. A device according to claim 1, wherein the start catalyst comprises a three-way catalyst.

14. A device according to claim 13, wherein the air-fuel ratio of the exhaust gas of engine is made stoichiometric to make the air-fuel ratio of the exhaust gas flowing to the three-way catalyst stoichiometric during the engine starting operation.

15. A device according to claim 1, wherein the air-fuel ratio of the exhaust gas of the engine is made lean to form the gas including oxygen.

16. A device according to claim 15, wherein the engine has a plurality of cylinders, the cylinders being divided into a plurality of cylinder groups, wherein the air-fuel ratio of the exhaust gas of a part of the cylinder groups is made lean to form the gas including oxygen, and the air-fuel ratio of the exhaust gas of at least one of the remaining cylinder groups is made rich to form the gas including the reducing agent.

17. A device according to claim 16, wherein each cylinder group is connected, via a corresponding branch exhaust passage, to a common interconnecting exhaust passage, start catalysts being arranged in each branch exhaust passage, an exhaust gas purifying catalyst being arranged in the interconnecting exhaust passage, and wherein the gas including oxygen and the gas including the reducing agent are mixed in the interconnecting passage after they pass through the start catalysts.

18. A device according to claim 16, wherein each cylinder group is connected to a common interconnecting exhaust passage, the start catalyst and the exhaust gas purifying catalyst being arranged in the interconnecting exhaust passage, and wherein the device further comprises bypass means for communicating the cylinder groups and the exhaust gas purifying catalyst by bypassing the start catalyst.

19. A device according to claim 18, wherein the bypass means comprises: a bypass passage connecting the interconnecting passage upstream of the start catalyst and the interconnecting passage between the start catalyst and the exhaust gas purifying catalyst; and a bypass valve for introducing the exhaust gases of the cylinder groups selectively to one of the bypass passage and the start catalyst, wherein the bypass valve introduces the exhaust gases of the cylinder groups into the bypass passage when the gas including oxygen and the gas including the reducing agent must be fed to the exhaust gas purifying catalyst.

20. A device according to claim 16, wherein the air-fuel ratio of the air-fuel mixture burned in the at least one of the remaining cylinder groups is made rich to form the gas including the reducing agent.

21. A device according to claim 16, wherein the cylinder has a fuel injector directly injecting fuel into the cylinder, and wherein the fuel injector of the at least one of the remaining cylinder groups injects fuel secondarily at the combustion stroke or the exhaust stroke of the engine to form the gas including the reducing agent.

22. A device according to claim 16, wherein the cylinders are divided into a first cylinder group and a second cylinder group, and wherein the air-fuel ratio of the exhaust gas of the first cylinder group is made lean to form the gas including oxygen, and the air-fuel ratio of the exhaust gas of the second cylinder group is made rich to form the gas including the reducing agent.

23. A device according to claim 15, further comprising a reducing agent injector arranged in the exhaust passage between the start catalyst and the exhaust gas purifying catalyst for injecting the reducing agent to the exhaust gas purifying catalyst, and wherein the air-fuel ratio of the exhaust gas of the engine is made lean to form the gas including oxygen and the reducing agent is injected by the reducing agent injector to form the gas including the reducing agent.

24. A device according to claim 1, wherein the air-fuel ratio of the exhaust gas of the engine is made rich to form the gas including the reducing agent.

25. A device according to claim 24, further comprising an oxygen injector arranged in the exhaust passage between the start catalyst and the exhaust gas purifying catalyst for injection oxygen to the exhaust gas purifying catalyst, and wherein the air-fuel ratio of the exhaust gas of the engine is made rich to form the gas including the reducing agent and oxygen is injected by the oxygen injector to form the gas including oxygen.

26. A device according to claim 1, wherein the reducing agent comprises hydrocarbon.

27. A device for purifying the exhaust gas of an engine having an exhaust passage, the device comprising:
an exhaust gas purifying catalyst arranged in the exhaust passage;
a start catalyst arranged in the exhaust passage upstream of the exhaust gas purifying catalyst;
means for forming a gas including oxygen;
means for forming a gas including a reducing agent;
means for forming at least one of the gas including oxygen and the gas including the reducing agent from the exhaust gas of the engine; and
means for mixing the gas including oxygen and the gas including the reducing agent disposed upstream of the start catalyst and feeding the gas mixture to the exhaust gas purifying catalyst without the gas mixture flowing into the start catalyst.

28. A device for purifying the exhaust gas of an engine having an exhaust passage, the device comprising:
an exhaust gas purifying catalyst arranged in the exhaust passage;
a start catalyst arranged in the exhaust passage upstream of the exhaust gas purifying catalyst;
means for forming a gas including oxygen;
means for forming a gas including a reducing agent;
means for forming at least one of the gas including oxygen and the gas including the reducing agent from the exhaust gas of the engine; and
means for mixing the gas including oxygen and the gas including the reducing agent and feeding the gas mixture to the exhaust gas purifying catalyst without the gas mixture flowing into the start catalyst;
wherein the engine has a plurality of cylinders, the cylinders being divided into a plurality of cylinder groups, wherein the air-fuel ratio of the exhaust gas of a part of the cylinder groups is made lean to form the gas including oxygen, and the air-fuel ratio of the exhaust gas of at least one of the remaining cylinder groups is made rich to form the gas including the reducing agent, and each cylinder has a fuel injector directly injecting fuel into the cylinder, and wherein the fuel injector of the at least one of the remaining cylinder groups injects fuel secondarily at the combustion stroke or the exhaust stroke of the engine to form the gas including the reducing agent.

* * * * *